(12) United States Patent
Stark

(10) Patent No.: US 9,164,730 B2
(45) Date of Patent: Oct. 20, 2015

(54) SELF-TIMED LOGIC BIT STREAM GENERATOR WITH COMMAND TO RUN FOR A NUMBER OF STATE TRANSITIONS

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 206 days.

(21) Appl. No.: 14/037,303

(22) Filed: Sep. 25, 2013

(65) Prior Publication Data
US 2015/0088949 A1    Mar. 26, 2015

(51) Int. Cl.
G06F 7/58    (2006.01)
(52) U.S. Cl.
CPC ....................................... G06F 7/584 (2013.01)
(58) Field of Classification Search
USPC ................................................ 708/250–256
See application file for complete search history.

(56) References Cited

U.S. PATENT DOCUMENTS

| | | | |
|---|---|---|---|
| 5,787,094 A * | 7/1998 | Cecchi et al. | 714/807 |
| 2003/0154389 A1* | 8/2003 | Peeters et al. | 713/193 |
| 2005/0222789 A1* | 10/2005 | West | 702/79 |
| 2006/0179369 A1* | 8/2006 | Bravo et al. | 714/718 |
| 2008/0240419 A1* | 10/2008 | Sandberg et al. | 380/2 |

* cited by examiner

Primary Examiner — Tan V. Mai
(74) Attorney, Agent, or Firm — Imperium Patent Works LLP; T. Lester Wallace; Mark D. Marrello

(57) ABSTRACT

A bit stream having non-deterministic entropy is generated by a Self-Timed Logic Entropy Bit Stream Generator (STLEBSG). The STLEBSG includes an incrementer and a linear feedback shift register (LFSR), both implemented in self-timed logic as parts of an asynchronous state machine. In response to a command, the incrementer asynchronously increments a number of times and then stops, where the number of times is determined by command. For each increment of the incrementer, the LFSR undergoes a state transition. As the incrementer increments, the LFSR outputs the bit stream. If the command is a run repeatedly command, then after the incrementer stops the incrementer is reinitialized and then again increments the number of times. This incrementing, stopping, reinitializing, and incrementing process is repeated indefinitely. Another command causes the incrementer to be loaded. Another command causes the LFSR to be loaded.

21 Claims, 24 Drawing Sheets

RANDOM NUMBER GENERATOR

ME ISLAND

ONLY ONE PERIPHERAL IS SELECTED, ALL NON SELECTED PERIPHERALS OUTPUT ZEROS.

SSB PERIPHERALS BLOCK

STATE DIAGRAM FOR A SELF-TIMED LOGIC STATE MACHINE

TWO WIRE LOGIC

CONTROL OF THE LATCHES OF A SELF-TIMED LOGIC STATE MACHINE

SELF-TIMED LOGIC DATA REGISTER CONTROLLER

SELF-TIMED LOGIC RUN-TO-COMPLETION CONTROLLER

KEY TO

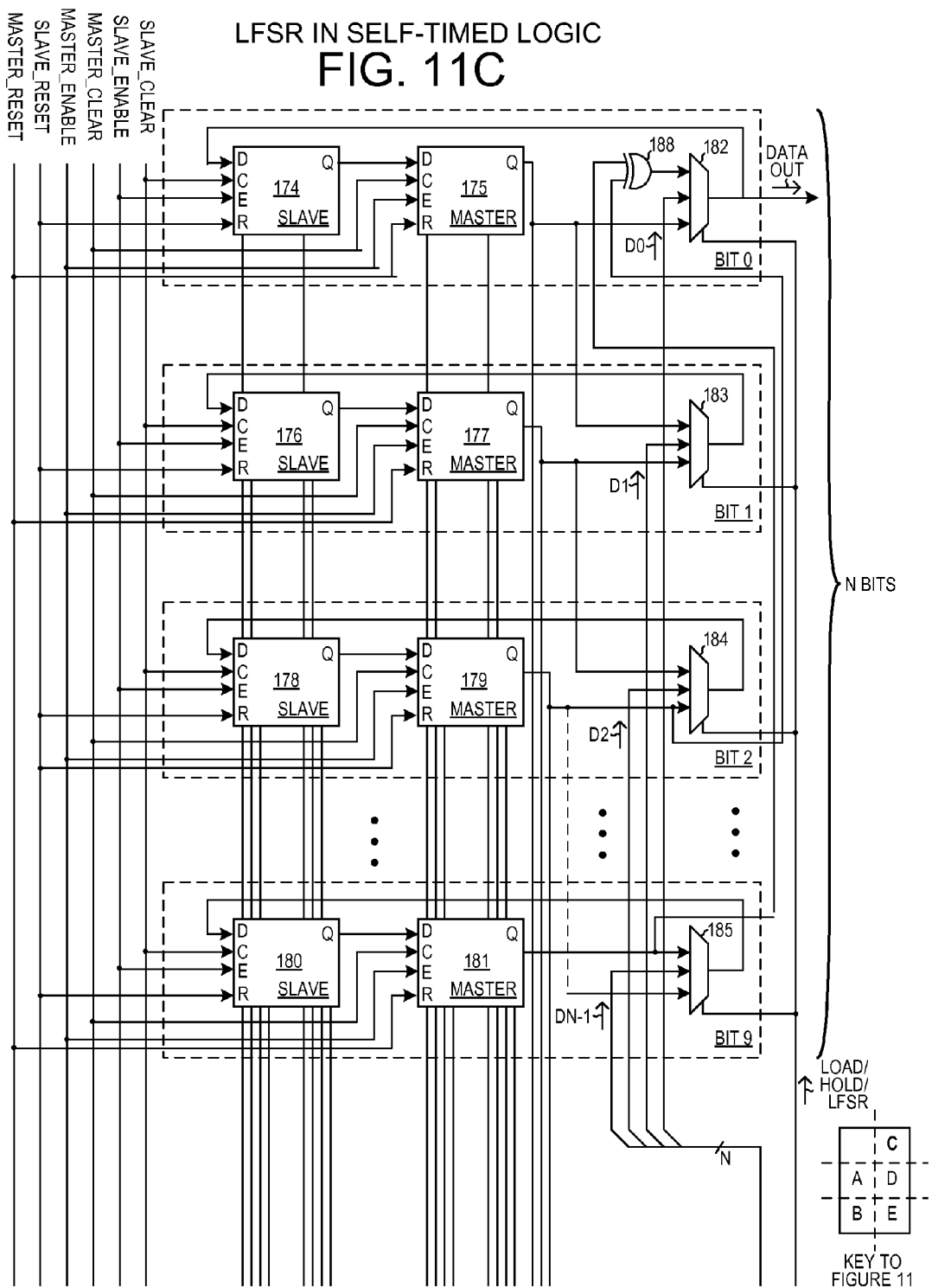

INCREMENTER / COUNTER IN SELF-TIMED LOGIC

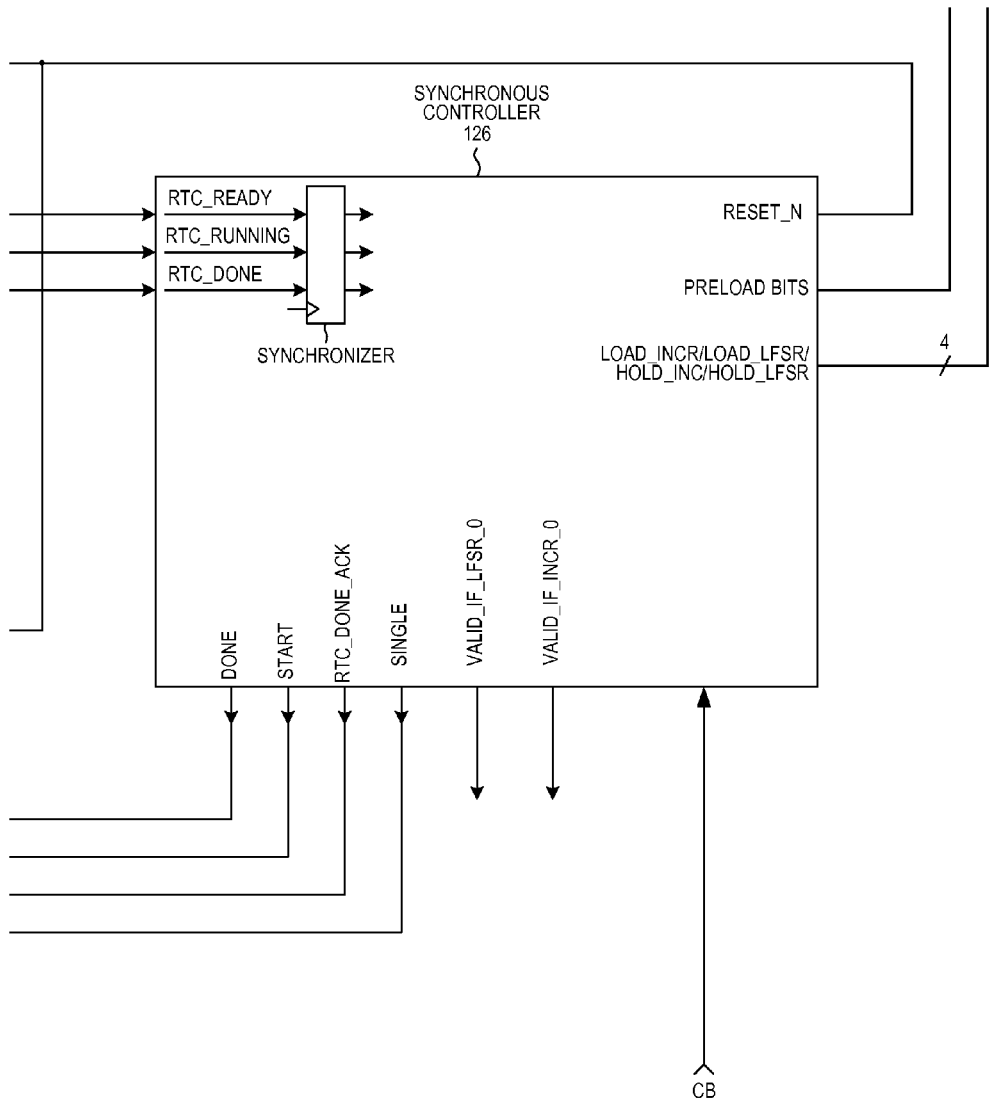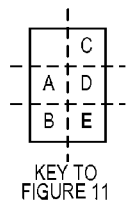
SYNCHRONOUS CONTROLLER
FIG. 11E
KEY TO
FIGURE 11

LOGIC BLOCK

TWO INPUT XOR GATE
(TWO WIRE LOGIC)

3:1 MULTIPLEXER
(TWO WIRE LOGIC)

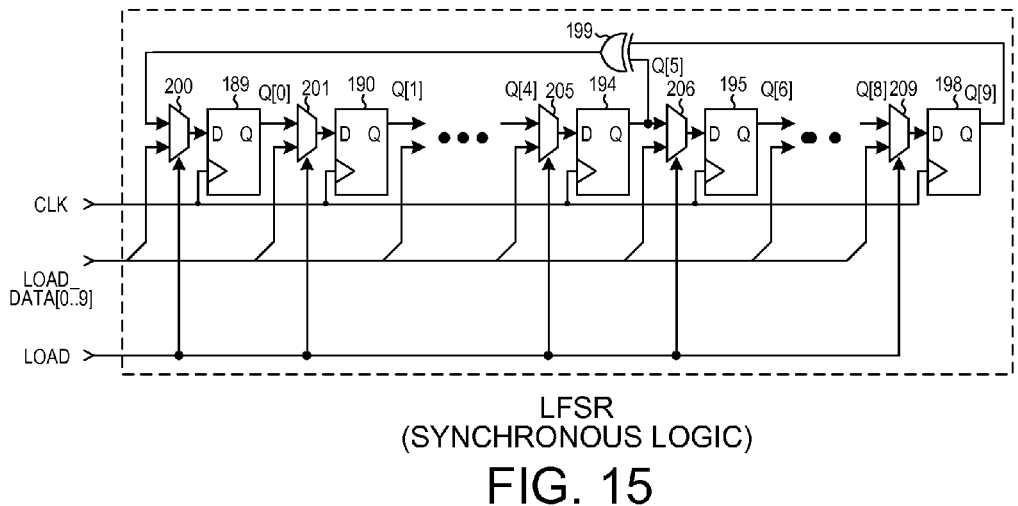
**LFSR
(SYNCHRONOUS LOGIC)**
FIG. 15
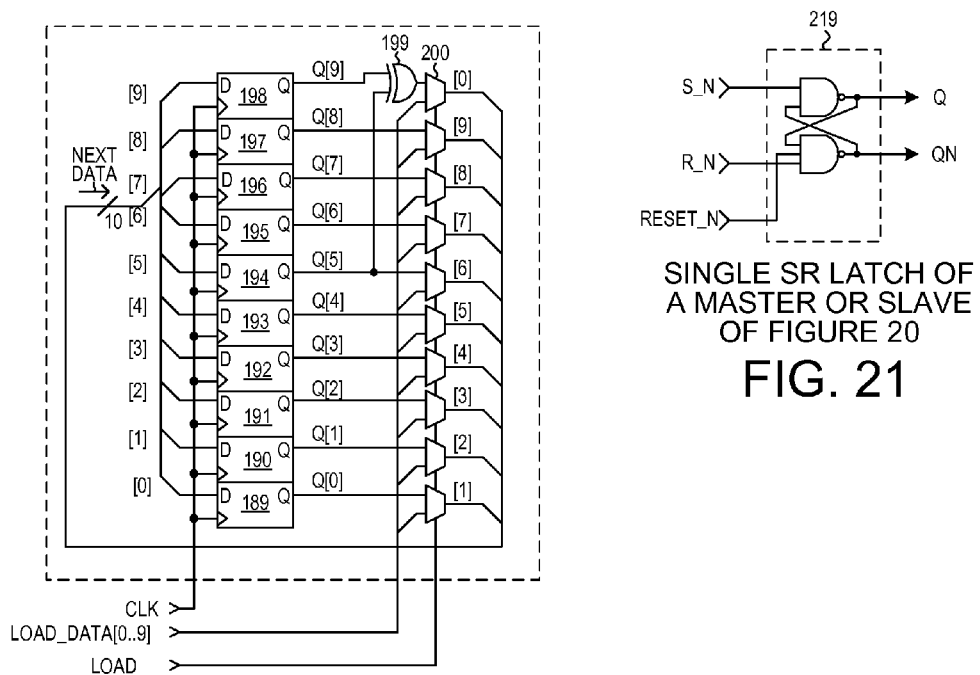
**SYNCHRONOUS LOGIC LFRS SHOWN IN
VERTICAL ORIENTATION**
FIG. 16
**SINGLE SR LATCH OF
A MASTER OR SLAVE
OF FIGURE 20**
FIG. 21

HALF ADDER COUNTER
(SYNCHRONOUS LOGIC)

SYNCHRONOUS LOGIC HALF ADDER COUNTER
(SHOWN IN VERTICAL ORIENTATION)

HALF ADDER
(TWO WIRE LOGIC)

SELF-TIMED LOGIC DATA LATCH (SLAVE OR MASTER)

REPEAT_INCR IS CLEARED WHEN "COMMAND REGISTER RUN ONCE COMMAND OR RUN REPEATEDLY COMMAND" IS RECEIVED.

STATE DIAGRAM OF THE SYNCHRONOUS CONTROLLER

CONFIGURATION REGISTER

COMMAND REGISTER

DATA REGISTER

SIGNAL STORAGE RING BLOCK

ONE POSSIBLE STRUCTURE
REPRESENTED BY THE
EXCLUSIVE XOR SYMBOL 226

ONE POSSIBLE STRUCTURE
REPRESENTED BY THE
EXCLUSIVE XOR SYMBOL 226

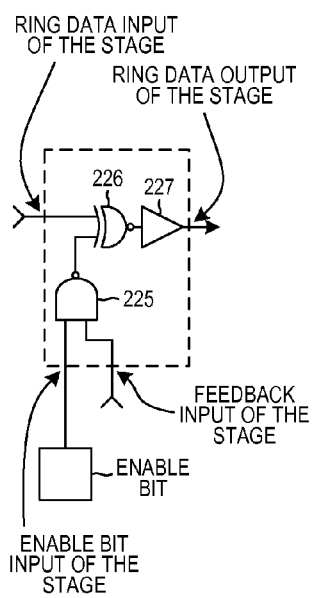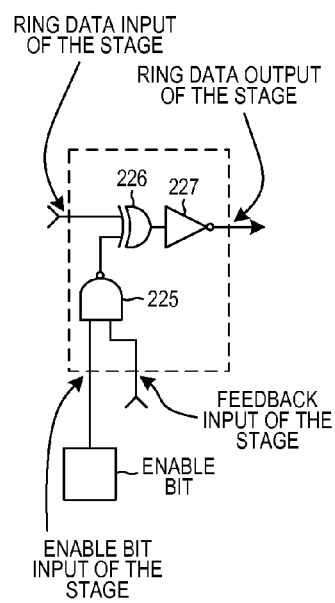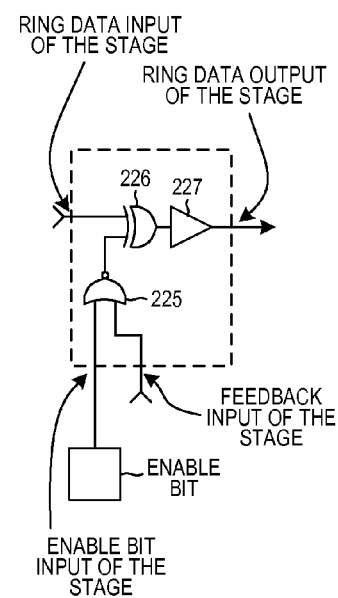
ALTERNATIVE STAGE
FIG. 31
ALTERNATIVE STAGE
FIG. 32
ALTERNATIVE STAGE
FIG. 33

SELF-TIMED LOGIC BIT STREAM GENERATOR WITH COMMAND TO RUN FOR A NUMBER OF STATE TRANSITIONS

TECHNICAL FIELD

The described embodiments relate generally to the generation of random numbers for use in networking, and more particularly to the generation of random numbers in a network flow processor integrated circuits.

BACKGROUND INFORMATION

In many networking applications, random numbers are used to encrypt information before the information is transmitted. New and superior ways of generating suitable random numbers on a network flow processor integrated circuit are sought.

SUMMARY

A network flow processor integrated circuit includes a transactional memory. One operation the transactional memory can perform is the generation of a random number. A random number generator within the transactional memory includes a self-timed logic entropy bit stream generator (STLEBSG), an entropy bit stream signal storage ring block, a pseudo-random number generator (PRNG), and a set of registers. In one example, the parts of the random number generator are configured and initialized by writing values across a first bus and into the set of registers. A resulting random number is generated and this random number is read out from the random number generator across a second bus. In another example, the set of registers is written to and the random number read back across the same bus.

In a first novel aspect, a bit stream is generated using the STLEBSG. A command is sent across a bus to the random number generator, where the random number generator includes the STLEBSG, and where the command includes a value. The command may be sent across the bus as one part, or an initial part having an opcode of the command can be sent in one bus transaction and the value can be sent in another bus transaction. In any case, the command causes the STLEBSG to state transition a number of times and then to stop automatically. The number of times is dependent upon the value. In one example, the STLEBSG includes a self-timed logic incrementer (counter), and an associated self-timed logic linear feedback shift register (LFSR). The self-timed logic incrementer is loaded with an initial count value. The self-timed logic incrementer then increments until its count rolls over to zero, at which point the incrementing automatically stops. For each increment of the self-timed logic incrementer, the associated self-timed logic LFSR is made to make one state transition. As a result of the state transitioning, the self-timed logic LFSR outputs a bit stream. The bit stream is used (either directly or indirectly) by a pseudo-random number generator to generate a multi-bit random number. Once the random number has been generated, it can be read from the random number generator across a bus.

In one example, the random number is read out across the same bus over which the command was sent to the random number generator. In another example, the random number is read out across a bus other than the bus over which the command was sent to the random number generator. For example, the command including the value (the value that determines the number of times the incrementer will increment before stopping) may be written into the random number generator across a special control bus (CB) at a time when the network flow processor integrated circuit is being initialized. Thereafter, during normal operation of the network flow processor integrated circuit, a processor on the integrated circuit can act as a bus master and can read a random number (as generated by the random number generator) from the transactional memory. The transactional memory in this read operation acts as the target, and the processor acts as the master. The bus is a command/push/pull (CPP) bus.

In some cases, the command is a "run once" command that causes the self-timed logic LFSR to state transition the number of times and then to stop. In other cases, the command is a run repeatedly command that causes the self-timed logic LFSR to state transition the number of times and then stop, but then the self-timed logic incrementer is reinitialized and the self-timed logic LFSR is made to transition the number of times again and then to stop once more, and to repeat. Other commands to the STLEBSG include a command to load a value into in the self-timed logic incrementer, and a command to load a value into the self-timed logic LFSR.

In a second novel aspect, an entropy signal generated by a self-timed logic circuit is stored in a signal storage ring. A command is received onto the random number generator. This command causes the STLEBSG within the random number generator to output a bit stream. The bit stream is supplied onto an input of the signal storage ring so that entropy of the bit stream is captured in the signal storage ring. The STLEBSG is then controlled to stop outputting the bit stream. The STLEBSG stops transitioning states, and is disabled, and therefore is made to consume less power as compared to when it was generating the bit stream. The bit stream as supplied to the signal storage ring stops transitioning. Entropy of the bit stream, however, remains stored in the signal storage ring. A signal output by the signal storage ring is then supplied to a pseudo-random number generator, thereby generating a random number after the STLEBSG has been stopped but while the signal storage ring is circulating.

In a third novel aspect, a circuit includes a configuration register and a signal storage ring. The signal storage ring includes a signal storage ring input node, a signal storage ring output node, and a plurality of series-connected stages. Each stage has a corresponding bit in the configuration register. The value of the bit determines whether a feedback path of the stage is enabled or is disabled. All of the stages of the ring can be identical, or some of the stages can differ from others of the stages. In one example, all the stages are identical, and each stage includes an exclusive OR circuit, a delay element that has an input coupled to an output of the exclusive OR circuit, and a combinatorial logic circuit whose output is coupled to a second input of the exclusive OR circuit. A first input of the exclusive OR circuit is a data input of the stage. An output of the delay element is a data output of the stage. The first input of the combinatorial logic circuit is coupled to a corresponding element bit for the stage (the enable bit is a part of the configuration register). The second input of the combinatorial logic circuit is the feedback input of the stage. The feedback input of all the stages of the ring are typically connected to the signal storage ring output node of the ring. In some examples, the exclusive OR circuit is replaced with an exclusive NOR circuit. In some examples the delay element is non-inverting, and in other examples the delay element is inverting. In some examples the combinatorial logic circuit is a NAND gate, whereas in other examples it is a NOR gate, an OR gate, or an AND gate.

Due to the feedback of the ring output signal back onto the feedback inputs of the stages, the bit stream is permuted in complex ways as the bit stream circulates around and around in the ring. Despite this complex permutation, original non-deterministic entropy in the original bit stream as received onto the signal storage ring input node is maintained in the ring. The original bit stream may stop transitioning, and the circuit that generated it may be powered down, and yet the entropy from the bit stream as previously captured in the ring remains stored in the ring.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11A is a part of a larger FIG. 11 of the STLEBSG.

FIG. 11B is a part of a larger FIG. 11 of the STLEBSG.

FIG. 11C is a part of a larger FIG. 11 of the STLEBSG.

FIG. 11D is a part of a larger FIG. 11 of the STLEBSG.

FIG. 11E is a part of a larger FIG. 11 of the STLEBSG.

FIG. 15 is a circuit diagram of a synchronous LFSR.

FIG. 16 is a circuit diagram that shows the synchronous LFSR of FIG. 15 in a different orientation.

FIG. 21 is a circuit diagram of one of the SR latches present in the self-timed logic data latch of FIG. 20.

FIG. 31 is a circuit diagram of a first alternative implementation of a stage of the ring of FIG. 28.

FIG. 32 is a circuit diagram of a second alternative implementation of a stage of the ring of FIG. 28.

FIG. 33 is a circuit diagram of a third alternative implementation of a stage of the ring of FIG. 28.

DETAILED DESCRIPTION

Figure 1:
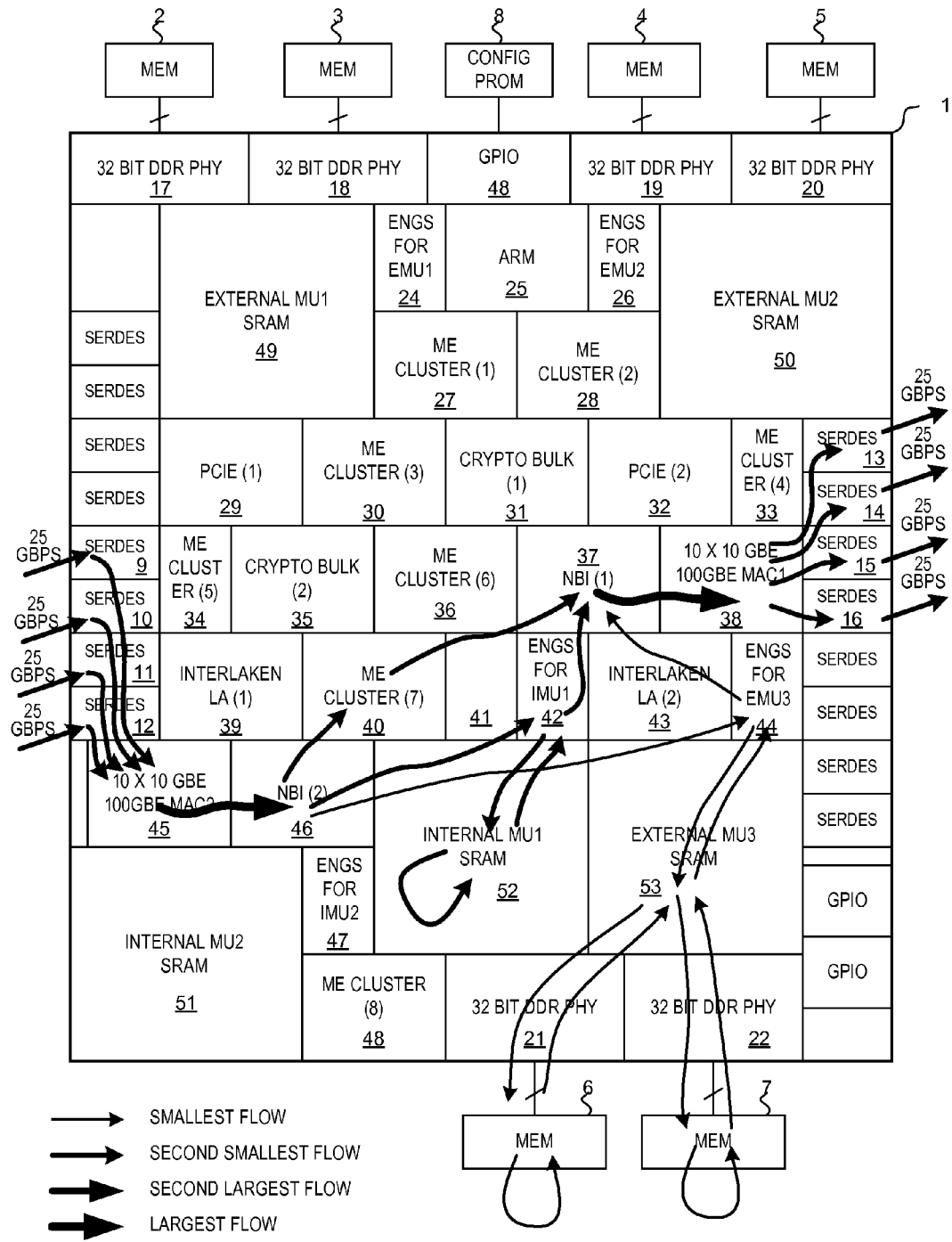
FIG. 1 is a top-down diagram of an Island-Based Network Flow Processor (IB-NFP) integrated circuit.

Reference will now be made in detail to background examples and some embodiments of the invention, examples of which are illustrated in the accompanying drawings. FIG. 1 is a top-down diagram of an Island-Based Network Flow Processor (IB-NFP) integrated circuit 1 and associated memory circuits 2-7. The IB-NFP integrated circuit sees use in network appliances such as, for example, an MPLS router. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads. The IB-NFP integrated circuit 1 is typically disposed on a line card along with optics transceiver circuitry, PHY circuitry and external memories.

SerDes circuits 9-12 are the first set of four SerDes circuits that are used to communicate with external networks via the PHY circuitry, the optics transceivers, and optical cables. SerDes circuits 13-16 are the second set of four SerDes circuits that are used to communicate with a switch fabric (not shown) of the MPLS router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 23 is used to access external PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus (CB), and 3) a configurable mesh event bus 9EB). Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 1 illustrate an operational example of IB-NFP integrated circuit 1 within the MPLS router. 100 Gbps packet traffic is received onto the router via an optical cable (not shown), flows onto the line card and through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to first NBI (Network Bus Interface) island 46. In addition to the optical cable that supplies packet traffic into the line card, there is another optical cable that communicates packet traffic in the other direction out of the line card.

For each packet received onto the IB-BPF in the example of FIG. 1, the functional circuitry of first NBI island 46 (also called the ingress NBI island) examines fields in the header portion of the packet to determine what storage strategy to use to place the packet into memory. In one example, first NBI island 46 examines the header portion and from that determines whether the packet is an exception packet or whether the packet is a fast-path packet. If the packet is an exception packet then the first NBI island 46 determines a first storage strategy to be used to store the packet so that relatively involved exception processing can be performed efficiently, whereas if the packet is a fast-path packet then the NBI island 46 determines a second storage strategy to be used to store the packet for more efficient transmission of the packet from the IB-NFP. First NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is a transactional memory that is tightly coupled to microengines in the ME island 40. The ME island 40 determines header modification and queuing strategy for the packet based on the packet flow (derived from packet header and contents) and the ME island 40 informs a second NBI island 37 (also called the egress NBI island) of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the first NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from first NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The header portions of both fast-path and exception packets are stored in the CTM (Cluster Target Memory) in ME island 40. The payload portions of fast-path packets are stored in internal SRAM in MU block 52, whereas the payload portions of exception packets are stored in external SRAM in external DRAMs 6 and 7.

ME island 40 informs second NBI island 37 (the egress NBI island) where the packet headers and the packet payloads can be found and provides the second NBI island 37 with an egress packet descriptor for each packet. The egress packet descriptor indicates a queuing strategy to be used for the associated packet. Second NBI island 37 uses the egress packet descriptors to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Twelve virtual output ports are provided in the example of FIG. 1.

General Description of the CPP Data Bus: A Command-Push-Pull (CPP) data bus structure interconnects functional circuitry in the islands of the IB-NFP integrated circuit 1. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion. For additional information on the IB-NFP integrated circuit, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

General Description of a Write That Results in a Pull: In one example of a CPP bus transaction, a master on one island can use a data bus interface (on the master's island) to perform a write operation over the CPP bus to a target on another island, where the target is made to respond by performing a pull operation. First, the master uses its data bus interface to output a bus transaction value onto the command mesh of the CPP data bus. The bus transaction value includes a metadata portion and a payload portion. The metadata portion includes a final destination value. The bus transaction value is a write command and is said to be "posted" by the master onto the command mesh. The metadata portion includes the 6-bit final destination value. This final destination value identifies an island by number, where the island identified is the final destination of the bus transaction value. The final destination value is used by the various crossbar switches of the command mesh structure to route the bus transaction value (i.e., the command) from the master to the appropriate target. A final destination island may include more than one potential target. A 4-bit target field of the payload portion indicates which one of these targets in the destination island it is that is the target of the command. A 5-bit action field indicates that the command is a write. A 14-bit data reference field is a reference usable by the master to determine where in the master the data is to be found. An address field indicates an address in the target where the data is to be written. The target receives the write command from the command mesh and examines the payload portion of the write command. From the action field, the target determines that it is to perform a write action. To carry out this write action, the target posts a bus transaction value called a "pull-id" onto the pull-id mesh. The final destination field of the metadata portion of the pull-id bus transaction indicates the island where the master is located. The target port field identifies which sub-circuit target it is within the target's island that is the target of the command. The pull-id is communicated through the pull-id mesh from the target back to the master. The master receives the pull-id from the pull-id mesh and uses the content of the data reference field of the pull-id to find the data. In the overall write operation, the master knows the data it is trying to write into the target. The data reference value that is returned with the pull-id is used by the master as a flag to match the returning pull-id with the original write operation that the target had previously initiated. The master responds by sending the identified data to the target across one of the data meshes data0 or data1 as a "pull" data bus transaction value. The term "pull" means that the data of the operation passes from the master to the target. The term "push" means that the data of the operation passes from the target to the master. The target receives the data pull bus transaction value across the data1 or data0 mesh. The data received by the target as the data for the write is the content of the data field of the pull data payload portion. The target then writes the received data into memory, thereby completing the write operation.

General Description of a Read That Results in a Push: A master can also use the data bus interface (on the master's island) to perform a read operation over the CPP bus from a target on another island, where the target is made to respond by performing a push operation. First, the master uses the data bus interface to "post" a bus transaction value onto the command mesh bus of the configurable mesh CPP data bus. The bus transaction value is a read command to read data from the target. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data. The target receives the read command and examines the payload portion of the command. From the action field of the command payload portion the target determines that it is to perform a read action. To carry out this read action, the target uses the address field and the length field to obtain the data requested. The target then "pushes" the obtained data back to the master across data mesh data1 or data0. To push the data, the target outputs a push bus transaction value onto the data1 or data0 mesh. The first bit of the payload portion indicates that the bus transaction value is for a data push, as opposed to a data pull. The master receives the bus transaction value of the data push from the data mesh bus. The master then uses the data reference field of the push bus transaction value to associate the incoming data with the original read command, and from the original read command determines where the incoming pushed data (data in the data field of the push bus transaction value) should be written into the master. The master then writes the content of the data field into the master's memory at the appropriate location, thereby completing the read operation.

Figure 2:
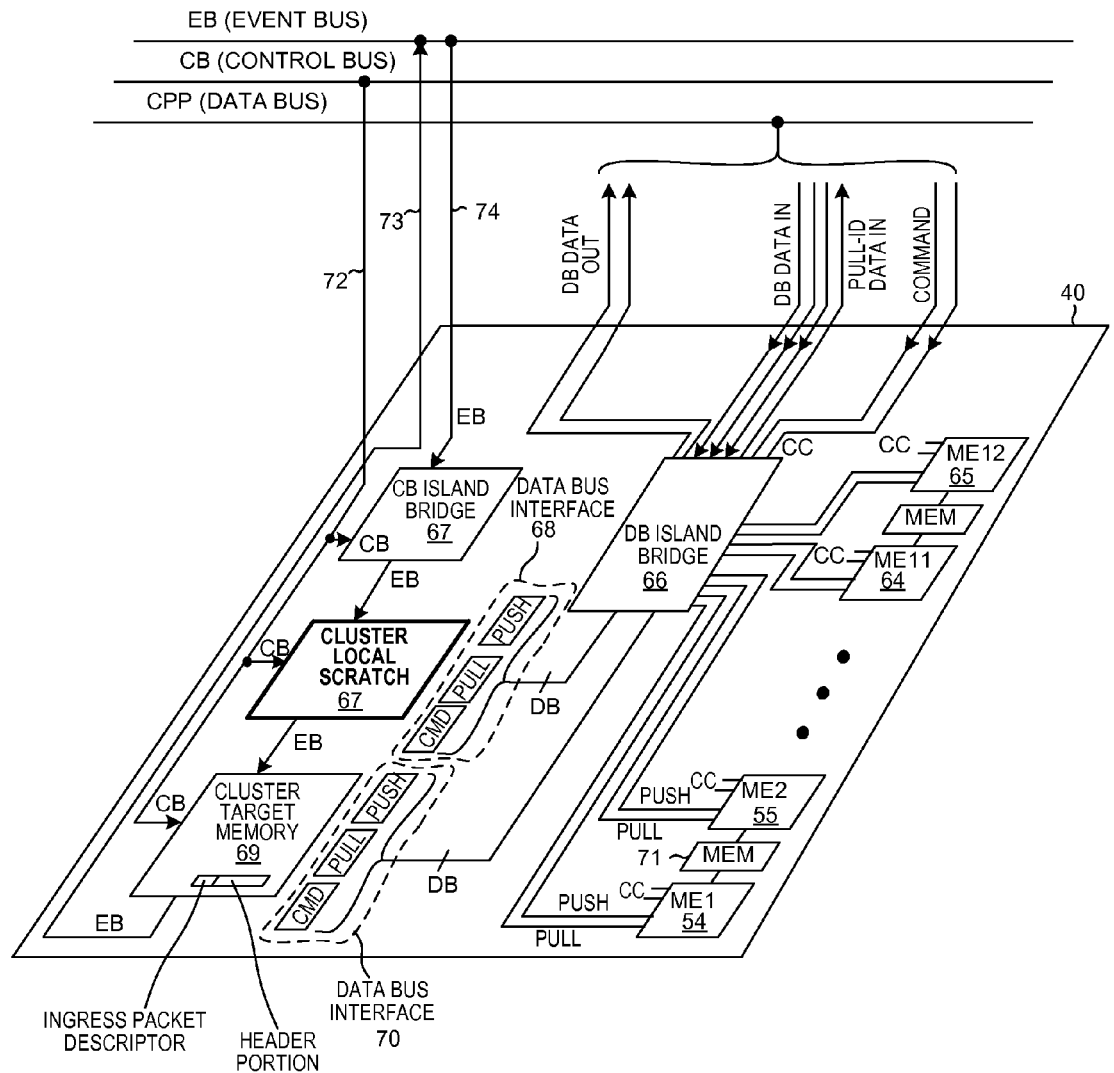
FIG. 2 is a simplified diagram of a microengine island (ME island) of the IB-NFP integrated circuit of FIG. 1.

FIG. 2 is a more detailed diagram of ME island 40. In addition to other parts, the ME island 40 includes six pairs of microengines 54-65, a data bus island bridge 66, the Cluster Local Scratch (CLS) 67, a data bus interface 68 for the CLS, the Cluster Target Memory (CTM) 69, and a data bus interface 70 for the CTM. Each pair of microengines shares a memory containing program code for the microengines. For example, memory 71 is shared between MEs 54 and 55. MEs can access the CLS via the DB island bridge 66. Reference numeral 72 identifies the CPP data bus. Reference numeral 73 identifies the control bus CB. Reference numeral 74 identifies the event bus EB.

Figure 3:
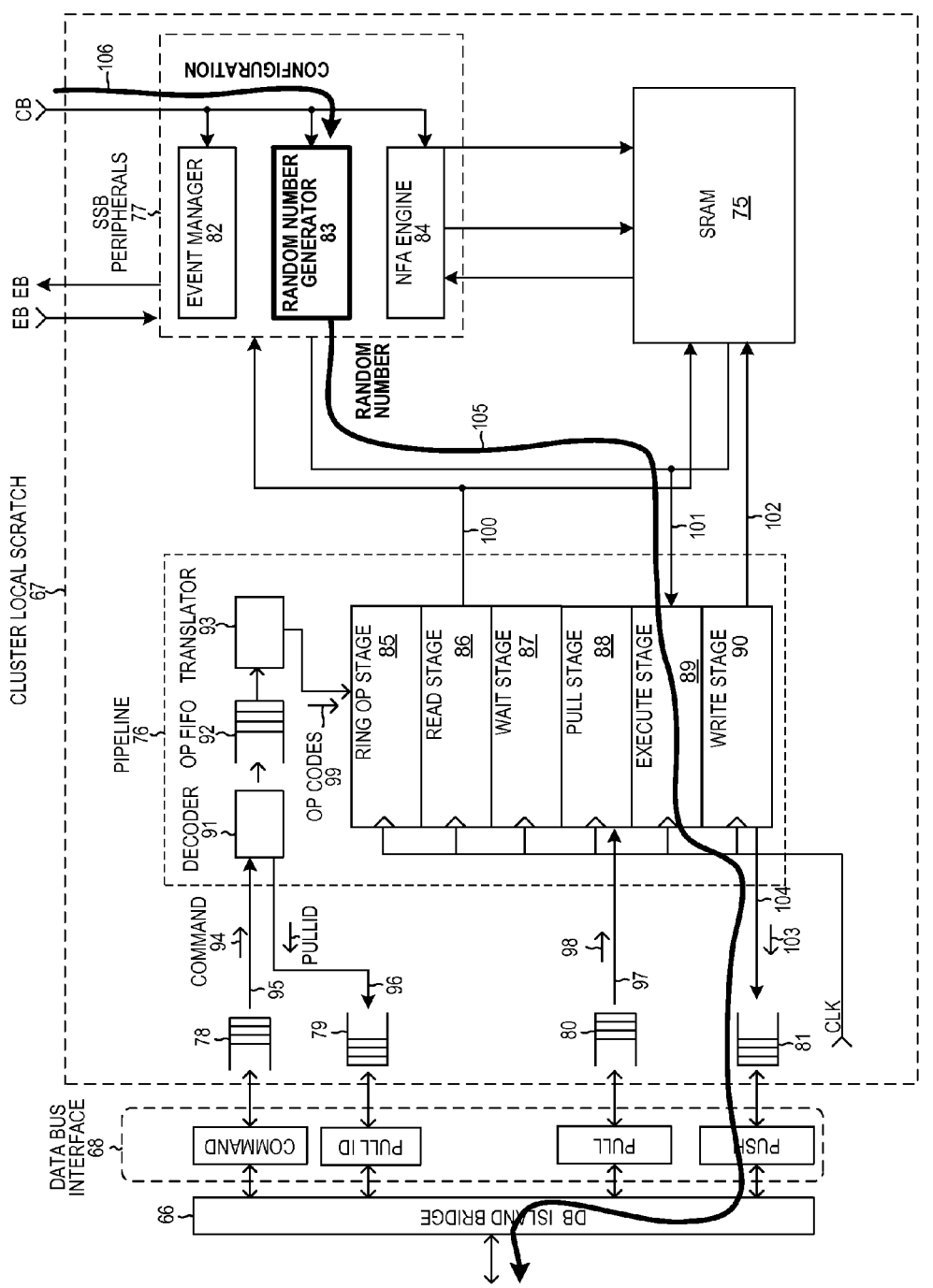
FIG. 3 is a simplified diagram of the Cluster Local Scratch (CLS) within the ME island of FIG. 2.

FIG. 3 is a diagram that shows CLS 67 in further detail. CLS 67 includes a memory unit 75, a control pipeline circuit 76, a SSB peripherals block 77, and FIFOs 78-81. SSB peripherals block 77 includes an event manager 82, a random number generator 83, and a Non-deterministic Finite state Automaton (NFA) engine 84. Control pipeline circuit 76 includes a ring operation stage 85, a read stage 86, a wait stage 87, a pull stage 88, an execute stage 89, a write stage 90, a decoder 91, an operation FIFO 92, and a translator 93.

General operation of the CLS 136 involves a flow of commands that are sent by one or more masters to the CLS as a target via the DB island bridge 66 and the data bus interface 68. For example, a master ME in the same ME island can supply a command 94 to the local CLS as a target using the same CPP data bus commands and operations as described above just as if the CLS were outside the island in another island, except that bus transaction values do not have a final destination value. The bus transaction values do not leave the island and therefore do not need that final destination information. The data bus interface 68 is the target of the bus transaction. The command 94 is pushed into FIFO 78. The command 94 passes through FIFO 78 and is presented to the pipeline 76 via conductors 95. The decoder 91 determines if the operation specified by the command will require data to be obtained (i.e., pulled) in order for the operation to be carried out. If the result of the decoding indicates that data should be pulled, then information to generate a pull-id bus transaction value is generated by the decoder and is sent across conductors 96 and into FIFO 79. The data bus interface 68 uses this information from FIFO 79 to generate an appropriate pull-id transaction value. The pull-id transaction value is communicated via DB island bridge 66 to the master ME. The master ME in turn returns the pull data 98 via DB island bridge 66 and the data bus interface 68 target. The pull data pass through pull FIFO 80 and conductors 97 back to the pipeline. It generally takes multiple clock cycles for the pull data to be returned. Meanwhile, after decoding by decoder 91, the command 94 passes through operation FIFO 92 and is translated into a set of opcodes 99 by translator 93. There is one opcode for each stage of the pipeline. Each opcode determines what a corresponding pipeline stage will do during the clock cycle when the command is being processed by that stage. If the command requires a value to be read from the peripherals block 77 or from memory unit 75, then the read stage 86 outputs a read request via conductors 100. Any data that is returned as a result of a read request on conductors 100 is received via conductors 101 on the input of the execute stage 89. The execute stage 89 then generates an output value as a function of information from the prior stages, pull data and/or data read from the peripherals or the memory unit. If the command requires an output value to be written to the memory unit, then the write stage 90 causes an appropriate write to occur across conductors 102. Likewise, if the command requires an output value to be returned to the command master across the DB island bridge, then the write stage 90 supplies data 103 across conductors 104 to FIFO 81 so that an appropriate bus transaction value is output from DB island bridge 66 back to the master. In one example, an ME can perform a read of a random number from the random number generator 83 of the SSB peripherals block 77. To do this, the ME posts a read bus transaction via the DB island bridge 66 and data bus interface 68 to the CLS 67. The resulting command passing into the pipeline 76 is a read command. The read stage supplies the address to be read to the random number generator 83 via conductors 100. In response, the random number generator 83 outputs the random number, which is receives by the execute stage of the pipeline via conductors 101, and is returned via FIFO 81, data bus interface 68 and the DB island bridge 66 to the ME. The heavy arrow 105 in FIG. 3 illustrates the path of the random number as it passes from the random number generator 83 back to the ME.

In addition, there are registers within the random number generator 83 that can be written to in order to configure and control the random number generator 83. A processor on the ARM processor island 25 performs writes across the control bus (CB) to load configuration and control information into these registers. Each of these registers has an identifying address on the CB bus. The heavy arrow 106 in FIG. 3 illustrates the path of information across the CB bus that loads these registers.

Figure 4:
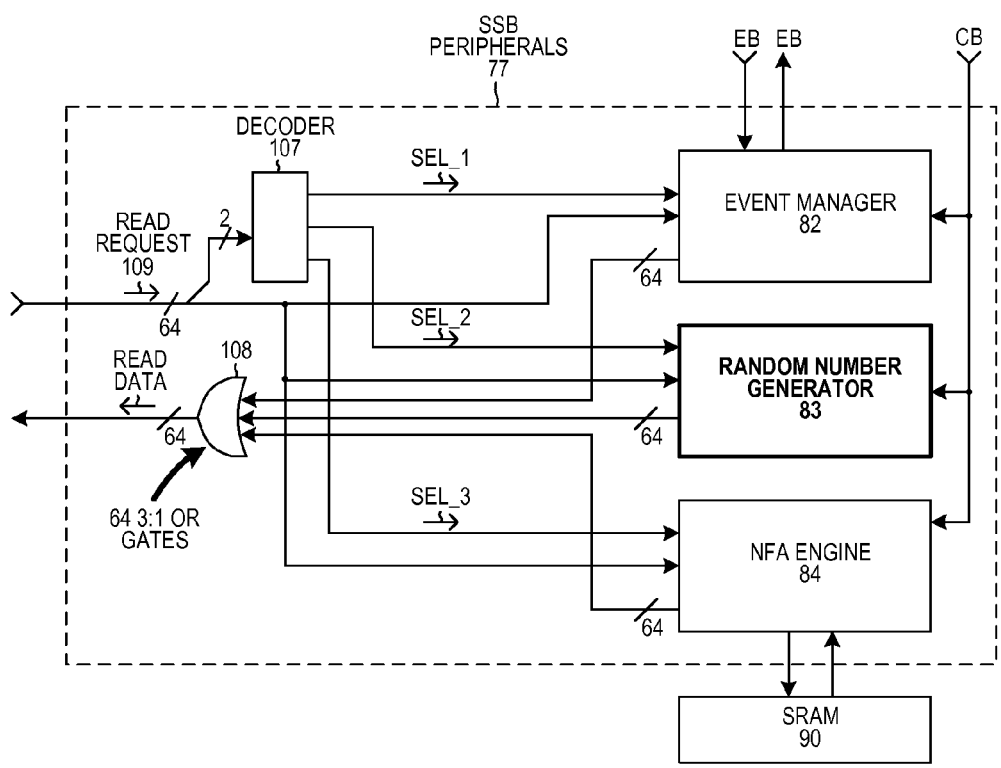
FIG. 4 is a diagram of the SSB peripheral block in the CLS of FIG. 3.

FIG. 4 is a more detailed diagram of the SSB peripherals block 77 of the CLS 67 of FIG. 3. SSB peripherals block 77 includes the event manager 82, the random number generator 83, the NFA engine 84, a decoder 107, and an output gate structure 108. A read request 109 is received from the pipeline 76. Two of the bits of the read request are supplied to the decoder 107 and determine which one of three select signals SEL_1, SEL_2 and SEL_3 will be asserted. Only one can be asserted at a time. If one of the blocks 82, 83 and 84 does not receive an asserted select signal, then that block will output all zeros on its 64-bit bus back to the output gate structure. Only the selected block will output a 64-bit value on its 64-bit bus back the output gate structure. Due to the OR logic of the output gate structure 108, the 64-bit value output by the selected block will pass through the output gate structure 108 and back to the pipeline. In this way, an ME acting as a master can cause the pipeline of the CLS to perform a read of a desired one of the blocks, and to return the read data back to the ME via the execute stage of the pipeline, FIFO 81, data bus interface 68, and DB island bridge 66. In one specific case, the data read is a random number that is output by the random number generator 83.

Figure 5:
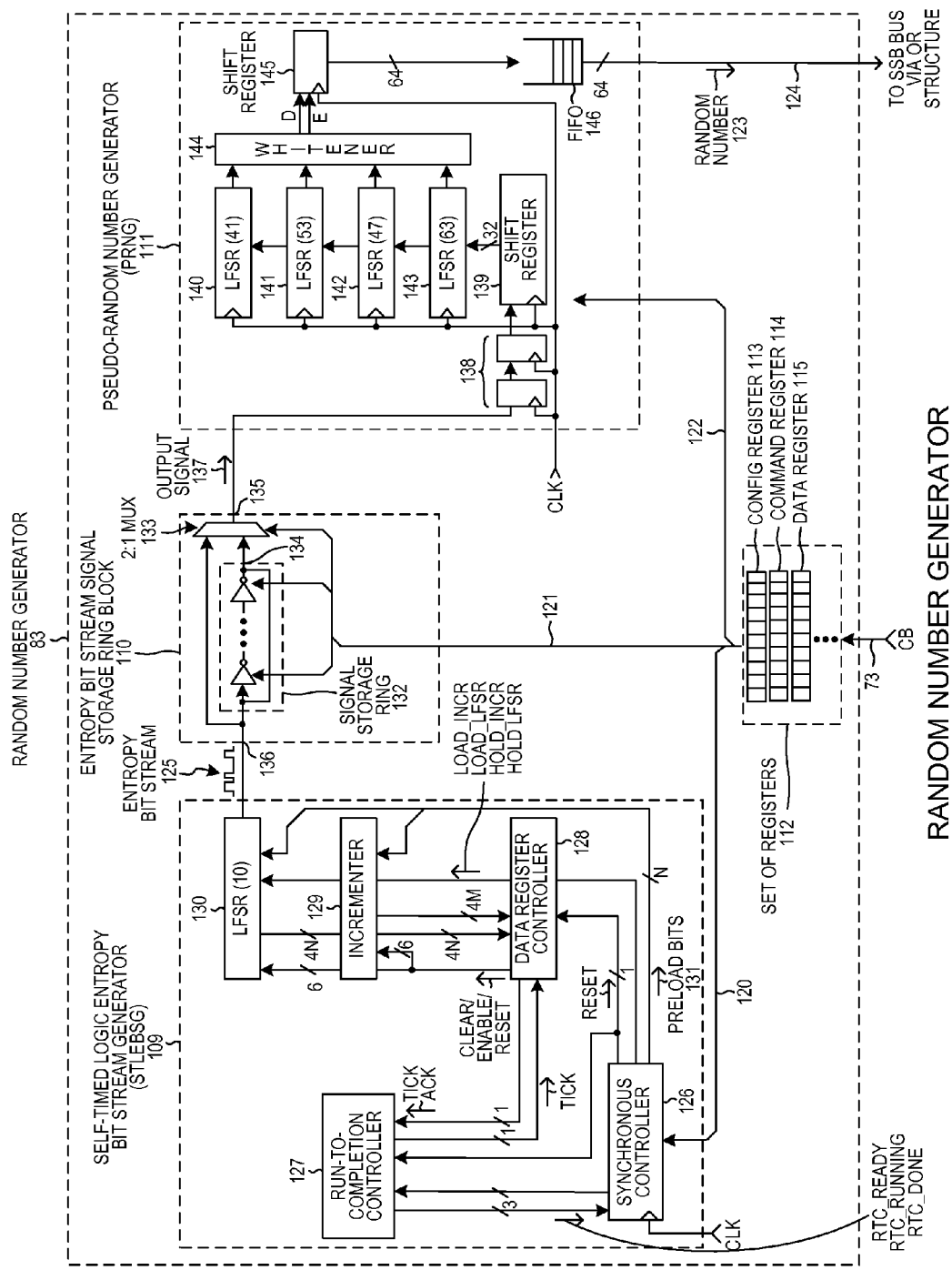
FIG. 5 is a diagram of the random number generator in the SSB peripherals block of FIG. 4.

FIG. 5 is a more detailed diagram of the random number generator 83 of FIG. 4. Random number generator 83 includes a Self-Timed Logic Entropy Bit Stream Generator (STLEBSG) 109, a signal storage ring block 110, a Pseudo-Random Number Generator (PRNG) 111 realized from synchronous logic, and a set 112 of registers. The set 112 of registers stores configuration information for the other blocks, and includes (among other registers not shown) a first configuration register 113, a command register 114, and a data register 115. Each register of the set can be written individually across the CB bus 73 as described above. The contents of the registers are supplied across conductors 120 to supply configuration and control information to STLEBSG 109, across conductors 121 to supply configuration information to the signal storage ring block 110, and across conductors 122 to supply configuration information to the pseudo-random number generator 111. The output of the random number generator is a 64-bit random number 123 that is output via conductors 124 through the output OR gate structure 108 (see FIG. 4) back to the execute stage of the pipeline.

STLEBSG 109 supplies a bit stream 125 to the signal storage ring block 110, where the bit stream 125 is said to contain nondeterministic "entropy". The time when an edge of the bit stream transitions is a function of propagation delays through the self-timed logic due to the asynchronous nature of the operation of the STLEBSG 109. The propagation delays vary depending on various factors including the temperature of the various parts of the STLEBSG circuitry, and including supply voltages supplied to various parts of the STLEBSG circuitry, and other complex factors.

STLEBSG 109 includes a synchronous controller 126, a self-timed logic run-to-completion controller 127, a self-timed logic data register controller 128, a self-timed logic incrementer 129, and a self-timed logic linear feedback shift register (LFSR) 130. Synchronous controller 126 includes a synchronous state machine that is clocked by a signal CLK. Synchronous controller 126 provides an interface to the self-timed logic portion of STLEBSG for signals output by the set 112 of registers. The other portions 127-130 of the STLEBSG are not clocked by the signal CLK and include no synchronous logic, but rather are an asynchronous logic circuit. The terms "asynchronous logic" and "self-timed logic" are used interchangeably here.

In a high-level explanation of the operation of STLEBSG, the incrementer 129 can be set up via the set 112 of registers to undergo a predetermined number of state transitions and then to stop. In the example of FIG. 5, the incrementer stops when its count rolls over to be a zero value. To cause the incrementer 129 to undergo a predetermined number of state transitions before stopping, the incrementer is preloaded with a count value. When the incrementer then starts counting, it will roll over in a few or larger number of state transitions depending on whether the initialized value is larger or smaller. For each such state transition of the incrementer 129, the self-timed logic LFSR 130 also performs a corresponding state transition. The initial value in the self-timed logic LFSR 130 is also initialized to a desired value. The arrow 131 labeled PRELOAD BITS in FIG. 5 identifies the initialization information that initializes the incrementer 129 and the self-timed logic LFSR 130. Once set up, the self-timed logic is started to run. This starting of the self-timed logic is carried out by writing another value into a particular one of the set 112 of registers. In response, the incrementer 129 starts incrementing and the self-timed logic LFSR starts changing state. When the incrementer stops transitioning states due to how it was set up, then the self-timed logic LFSR 130 also stops. Depending on how the STLEBSG was set up, the incrementer may then be automatically reinitiated with start values, and may then be automatically started to transition states once more. If the STLEBSG is set up a different way, then once the incrementer rolls over and stops the incrementer and self-timed logic LFSR remain stopped. The run-to-completion controller 127 and the data register controller 128 together provide the appropriate control signals to the master and slave sequential logic elements of the incrementer and the self-timed logic LFSR.

Signal storage ring block 110 includes a signal storage ring 132 and a two-to-one multiplexer 133. The signal storage ring 132 includes a plurality of configurable stages, where each of the stages is configured by a respective one of a plurality of configuration stage enable bits output from the configuration register 113 in the set 112 of registers. Due to the configuration bits in configuration register 113, the signal storage ring 132 can be configured in various different ways. In one way, the entropy bit stream 125 passes into the signal storage ring block 110 via input node 136, and passes through the series-connected stages of the ring, and is therefore captured in the ring. The captured signal then starts circulating back from the output node 134 of the storage ring back to a feedback input of the first stage of the ring. Depending on how the various stages of the ring are configured as the bit stream loops back, the bit stream is permuted in complex ways as it circulates around and around in the ring, but the original nondeterministic entropy in the original bit stream 125 as received from STLBSG 109 is maintained. Another configuration bit is supplied to the select input of multiplexer 133. In one configuration, the bit stream 125 is supplied via the multiplexer 133 onto the output node 135 of the signal storage ring block 110, thereby effectively bypassing the signals storage ring 132. In another configuration, a bit stream signal from the output node 134 of the ring is supplied via the multiplexer 133 onto the output node 135 of the block. The resulting output signal 137 is supplied to the pseudo-random bit stream generator 111.

Pseudo-random number generator 111 includes a synchronizer 138, a shift register 139, a 41-bit linear feedback shift register (LFSR) 140, a 53-bit LFSR 141, a 47-bit LFSR 142, a 63-bit LFSR 143, a whitener 144, an output shift register 145, and an output FIFO 146. The output signal 137 from the signal storage ring block 110 is synchronized to the signal CLK by passing it through the synchronizer 138. The resulting synchronized entropy signal is shifted into, and is captured in, shift register 139. Each of the four LFSRs can be individually configured via the CB bus: 1) to seed the bottom 32 bits of the LFSR to the 32-bit value output by the shift register 139, 2) to XOR the bottom 32 bits of the LFSR to the 32-bit value output by the shift register 139, or 3) not to use the 32-bit value output by the shift register 139 to reseed any bits of the LFSR. Each cycle of the signal CLK, a bit is output from each of the LFSRs. Four bits are therefore supplied to whitener 144 at a time. The whitener 144 is configurable as a lookup table to map a set of incoming four bits to a data output value D and an enable bit E in a selectable one of various different ways. In one way, if all the four bits from the LFSRs are "1" then the whitener 144 outputs a digital "1" as the data value D to shift register 145 and also asserts the enable signal E. Because the shift register 145 is enabled by the enable signal E, the shift register shifts in the "1" value on the next rising edge of CLK. If all the four bits from the LFSRs are "0", then the whitener 144 outputs a digital "0" as the data value D to shift register 145 and also asserts the enable signal E. Because the shift register 145 is enabled by the enable signal E, the shift register shifts in the "0" value on the next rising edge of CLK. If, however, the four bits received from the LFSRs 140-143 are not either all "1" or all "0", then the whitener 144 does not assert the enable signal E and consequently no value is shifted into the shift register 145. The 64 bits in shift register 145 are supplied in parallel form to output FIFO 146. These 64 bits are the 64-bit random number 123 that is output from the random number generator 83. The FIFO 146 is loaded whenever the shift register has 64 valid data bits so that each 64-bit random number value in FIFO 146 represents a different 64-bit section of the bit stream output from whitener 144. When the FIFO is loaded the shift register is set to zero valid bits. Since the whitener has the enable signal E it can take 64 or more cycles for the shift register to 64 valid data bits. After a 64-bit value is read from FIFO, the value is automatically cleared from the FIFO so that the same value cannot be read twice. The operation described above is but one configuration of the pseudo-random number generator 111. The LFSRs 140-143 and the whitener 144 can be initialized and configured in different ways by writing appropriate configuration information across the CB bus into other configuration registers of the set 112 of registers.

Figure 6:
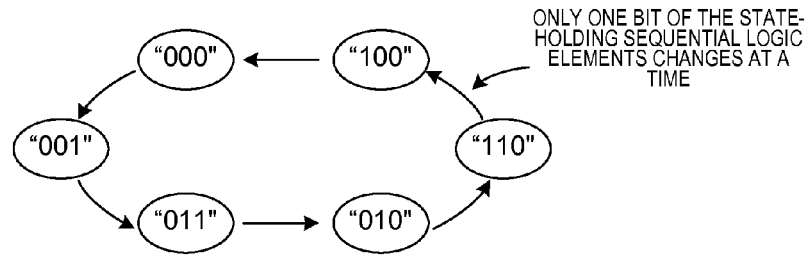
FIG. 6 is a state diagram that illustrates how only one bit of the state-holding sequential logic elements is changed at a time in a self-timed logic state machine.

Operation of the self-timed logic entropy bit stream generator (STLEBSG) 109 is explained below in connection with FIGS. 6-22. STLEGBSG 109 involves a self-timed logic state machine. In the design of such a self-timed logic state machine, the current state of the state machine is stored in latches. As illustrated in FIG. 6, only one bit stored in the state-holding latches is allowed to change at a time. The state transitions in the example of FIG. 6 are "000"→"001"→"011"→"010"→"110"→"100".

Figure 7:
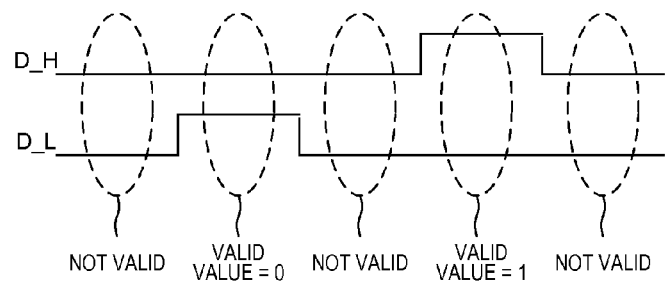
FIG. 7 is a waveform diagram that illustrates two wire logic.

FIG. 7 illustrates two-wire logic signaling that is employed in the self-timed logic state machine. Rather than communicating a digital "0" value or a digital "1" value using a single signal as is common in ordinary digital electronics, in two-wire logic two signals are used. If the signal D_L is high, then a digital "0" is being communicated. If the signal D_H is high, then a digital "1" is being communicated. If neither D_L nor D_H is high, then no data value is being communicated. The absence of a data value is referred to as "not valid". The circuitry outputting the signals is designed so that both signals D_L and D_H are never high at the same time. It is considered an illegal condition for both signals of the two-wire logic signals to be high at the same time. Whenever the data value being communicated changes from either a "0" to a "1" or from a "1" to a "0", there must be an intervening time when "not valid" is communicated.

A stored data state can be realized by a set of slave latches and master latches that store the state of the state machine, and an amount of next state logic. In the case of a self-timed logic state machine, data is not clocked into the slave on one edge of a clock and is then clocked from the slave and into the master on the opposite edge of the clock. Rather, there is no clock in a self-timed logic state machine. In a self-timed logic state machine, the slave is controlled to be "cleared" (so that the slave stores no valid data). Only when this is done is the slave then enabled. The enabling allows the slave to latch data. Only when the slave latch is confirmed to be storing valid data is the master controlled to be "cleared". When the master is confirmed to be cleared (storing no valid data), then the master is enabled to latch data from the slave. Each slave and master pair of the state machine is cleared and enabled in this chained fashion.

Figure 8:
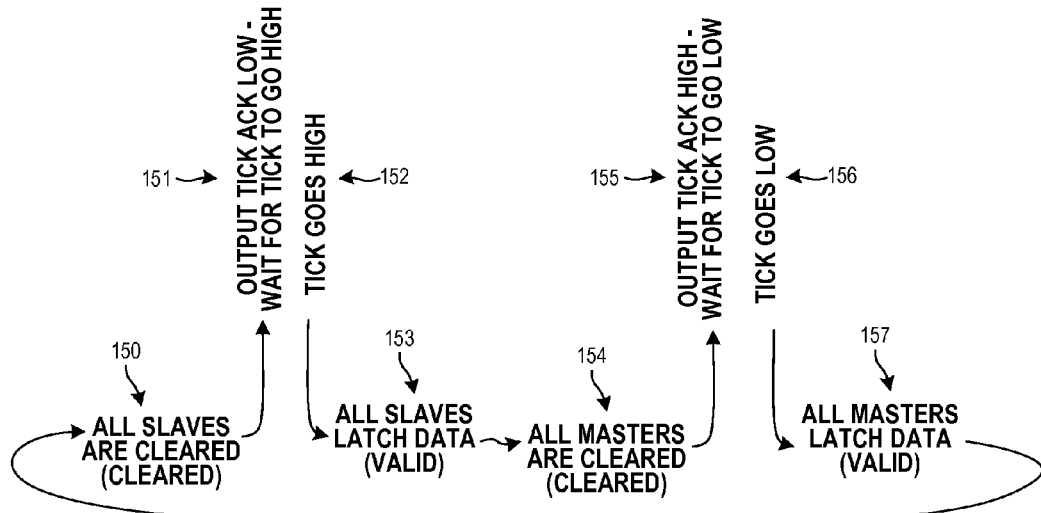
FIG. 8 is a diagram that shows how slave latches and master latches can be controlled to implement a self-timed logic state machine.

FIG. 8 is a diagram that illustrates how multiple slave latch/master latch pairs are controlled to operate. The slave latch/master latch pairs are used to store data state in the state machine. In a first state (150), all the slave latches are controlled to be "cleared". "Cleared" means that the slave latches are controlled so that they output "not valid". "Cleared" does not mean that the latches are made to store "0" values.

Once the slaves are confirmed to be cleared, then the state machine is made to force a TICK_ACK signal low (151). Thereafter the state machine is not to transition state again on its own, but rather is to wait for the incoming TICK signal to go high. The TICK signal is supplied to the state machine to prompt the state machine to transition states, and to prevent the state machine from transitioning states until certain events have occurred. As explained in further detail below, and external circuit controls the self-timed state machine by supplying it with a TICK high signal and then waiting for the self-timed logic to transition states such that the state machine then outputs a TICK_ACK high signal and stops. Likewise, the external circuit controls the self-timed state machine by supplying it with a TICK low signal and then waiting for the self-timed logic to transition states such that the state machine then outputs a TICK_ACK low signal and stops.

The external circuit then asserts the signal TICK high (152). The self-timed state machine responds by enabling all slave latches to receive data. When all the slave latches are confirmed to have stored valid data (153), then a state transition occurs. All master latches are then controlled to clear themselves (154). When all master latches are confirmed not to store valid data (to be "cleared"), then the state machine asserts the TICK_ACK signal high (155), stops, and then waits for TICK to go low. After an amount of time, the external signal asserts TICK low (156) to start the state machine transitioning again. The self-timed state machine then causes all masters to be enabled (157) so the master latches can be made to receive data. When all the master latches are confirmed to be storing valid data, then a state transition occurs, and all slave latches are again controlled to clear themselves (150). The slave latches and the master latches are made to be cleared, and then to latch valid data, back and forth in this way. The rate at which the state transitioning occurs is throttled by the TICK signal that is supplied to the self-timed logic circuit. A self-timed logic state machine can be made of such slave and master latches by providing next state determining logic that determines the next data value latched into the latches as a function of the current state and input signals.

Figure 9:
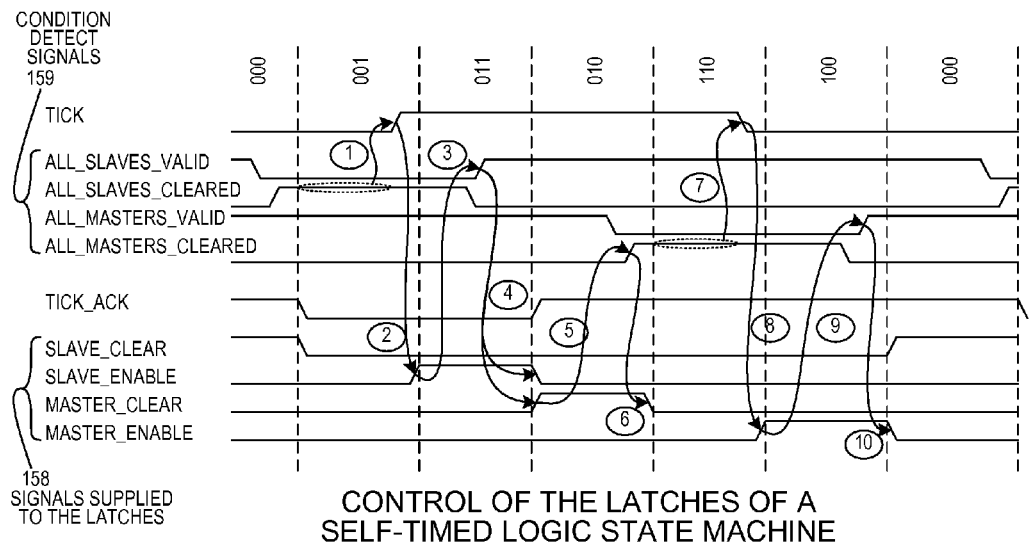
FIG. 9 is a waveform diagram that illustrates how slave latches and master latches can be controlled to implement a self-timed logic state machine.

FIG. 9 is a waveform diagram that illustrates how signal TICK is used to throttle a self-timed logic state machine involving slave latches and master latches. The state transitions are the same as in FIG. 6 and are: 000→001→011→010→011→100→000. Initially the state is "001". The signal ALL_SLAVES_CLEARED is received from the latches. This signal indicates that all the slave latches have been cleared, i.e. none of the slave latches contains valid data. State machine operation is suspended in this condition until the TICK signal is made to go high by an external circuit. The signal TICK going high causes the state to transition to "011" and causes a SLAVE_ENABLE signal to be sent to the slave latches. In response to the SLAVE_ENABLE signal being asserted, the slaves are enabled to latch data. Accordingly, after some time all the slave latches have latched data. The signal ALL_SLAVE_VALID then goes high indicating that each of the slave latches has been confirmed to store valid data. In response, the state transitions to "010" and the SLAVE_ENABLE signal is deasserted low, and the signal MASTER_CLEAR is asserted high. With a clear control signal being supplied to the master latches, all the master latches come to be cleared (so that none of the master latches stores valid data). When all the master latches are confirmed to be cleared, the ALL_MASTERS_CLEARED signal is asserted high. This causes the state to transition to "110" and causes MASTER_CLEAR control signal to go low. At this time all master latches are cleared. State does not transition until TICK is asserted low by the external circuit. At some time later, TICK is asserted low. This causes state to transition to "100" and causes MASTER_ENABLE to be asserted high. Due to MASTER_ENABLE being asserted high, the master latches proceed to latch data. When all the master latches are confirmed to be storing valid data, then the signal ALL_MASTERS_VALID is goes high. ALL_MASTERS_VALID going high causes state to transition to back to the "000" and causes MASTER_ENALBE to go low. The slave latches and the master latches are controlled in this way with the slave latches being cleared, then being made to latch data, then with the master latches being cleared, then with the master latches being made to latch data, and so forth. The four signals 158 of the waveform diagram of FIG. 9 are control signals supplied to the latches. The four signals 159 of the waveform diagram of FIG. 9 are detection signals that indicate conditions of the slave latches and master latches. For example, a slave latch outputs a two-wire logic value on its Q_H and Q_L latch output leads. If the latch is in a cleared condition, then both the Q_H signal and the Q_L signal will be low. Accordingly, a two-input NOR gate coupled to receive the Q_H and Q_L signals from the latch will output a digital high signal only if both Q_H and Q_L are low. The NOR gate therefore detects the condition of the latch being in a cleared state. If each of the latches has such a two-input NOR gate detecting whether it is cleared, then the logical AND of all the NOR gate output signals will indicate whether all the latches are cleared. In this way, a signal such as the ALL_SLAVES_CLEARED is generated from the latch output signals. It is also noted that the two-level latch state machine itself (which controls the Q_L and Q_H latches) can only transition to state 011 when the Q_L and Q_H bits are both low, so the state of 011 can be used instead to indicate the condition of the latch being in a cleared state.

Figure 10:
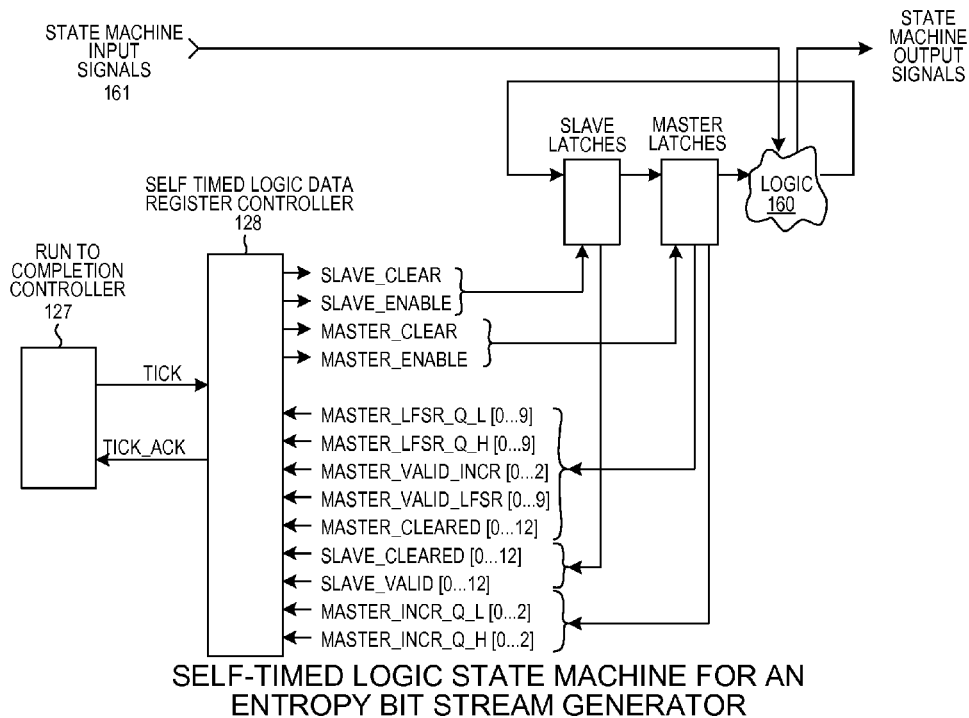
FIG. 10 is a high-level block diagram that illustrates how a circuit that can control the slave latches and master latches of a self-timed logic state machine.

FIG. 10 is a diagram is a block diagram of circuit that can control pairs of slave and master latches to carry out the transitioning illustrated in the waveform diagram of FIG. 9. The self-timed logic data register controller 128 receives detect signals from the slave latches and the master latches. The self-timed logic data register controller 128 uses these signals, together with the TICK throttling signal received form the run-to-completion controller 127, to generate the SLAVE_CLEAR, SLAVE_ENABLE, MASTER_CLEAR and MASTER_ENABLE control signals that are then supplied back to the slave latches and master latches. The logic 160 and input signals 161 determine the data that is latched into the slave latches next. Provided that the state machine is not waiting for TICK to change, the state only transitions when the actions of the prior state are confirmed to have been completed. The rate at which the actions of the prior state complete depends on propagation delays through the self-timed logic.

The self-timed logic circuitry of the STLEBSG 109 of FIG. 5 is implemented using the architecture set forth in FIG. 10. The incrementer 129 is a three-bit counter, where each bit is a slave latch/master latch pair. The self-timed logic LFSR 130 is a ten-bit LFSR, where each bit is a slave latch/master latch pair. Each of the slave latch/master latch pairs is controlled as set forth in FIG. 10. In another example the self-timed logic circuitry includes a 15 bit incrementer and a 15-bit LFSR.

Figure 11A:
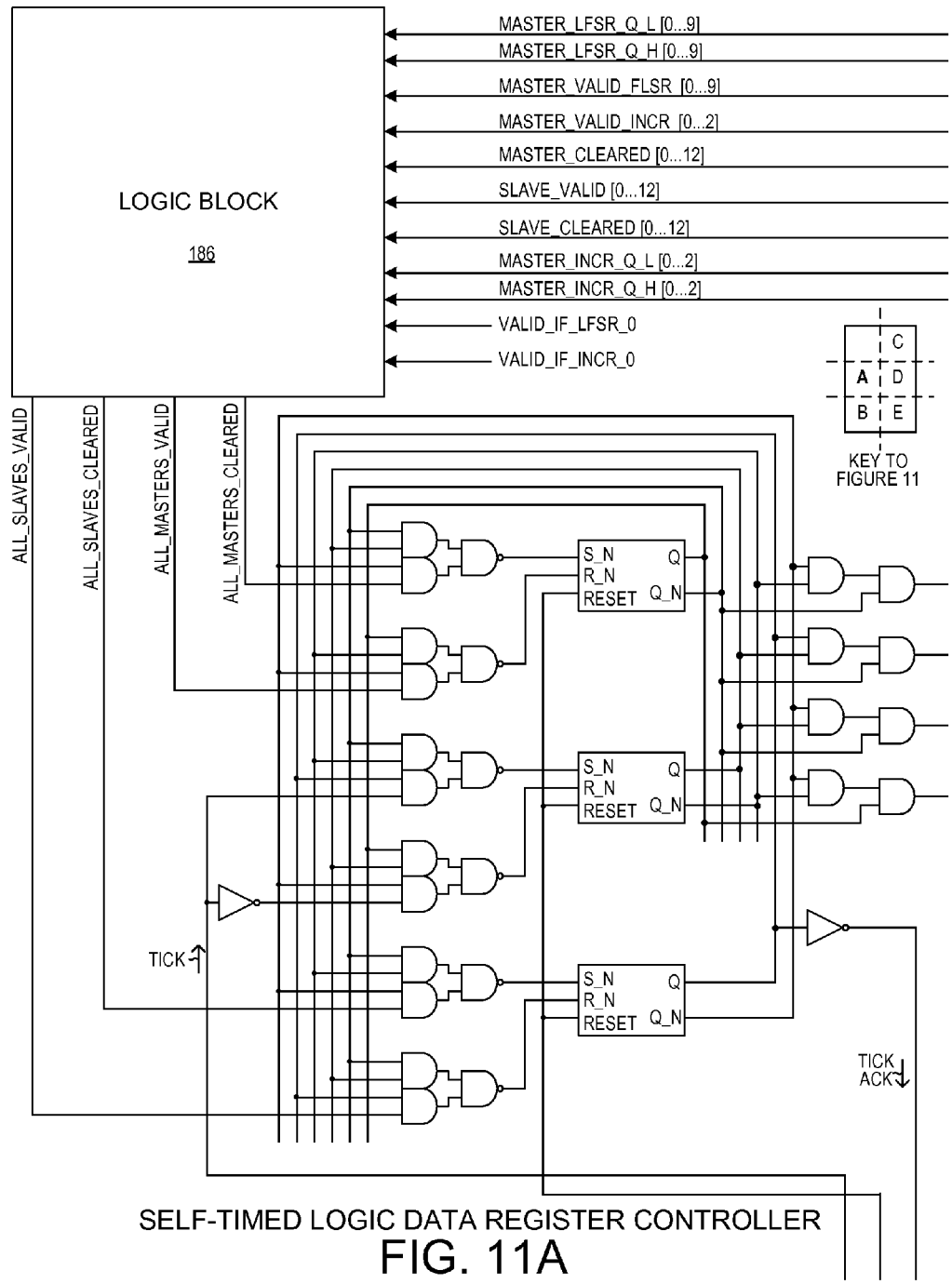
FIG. 11A is a circuit diagram of the self-timed logic data register controller of the STLEBSG.
Figure 11B:
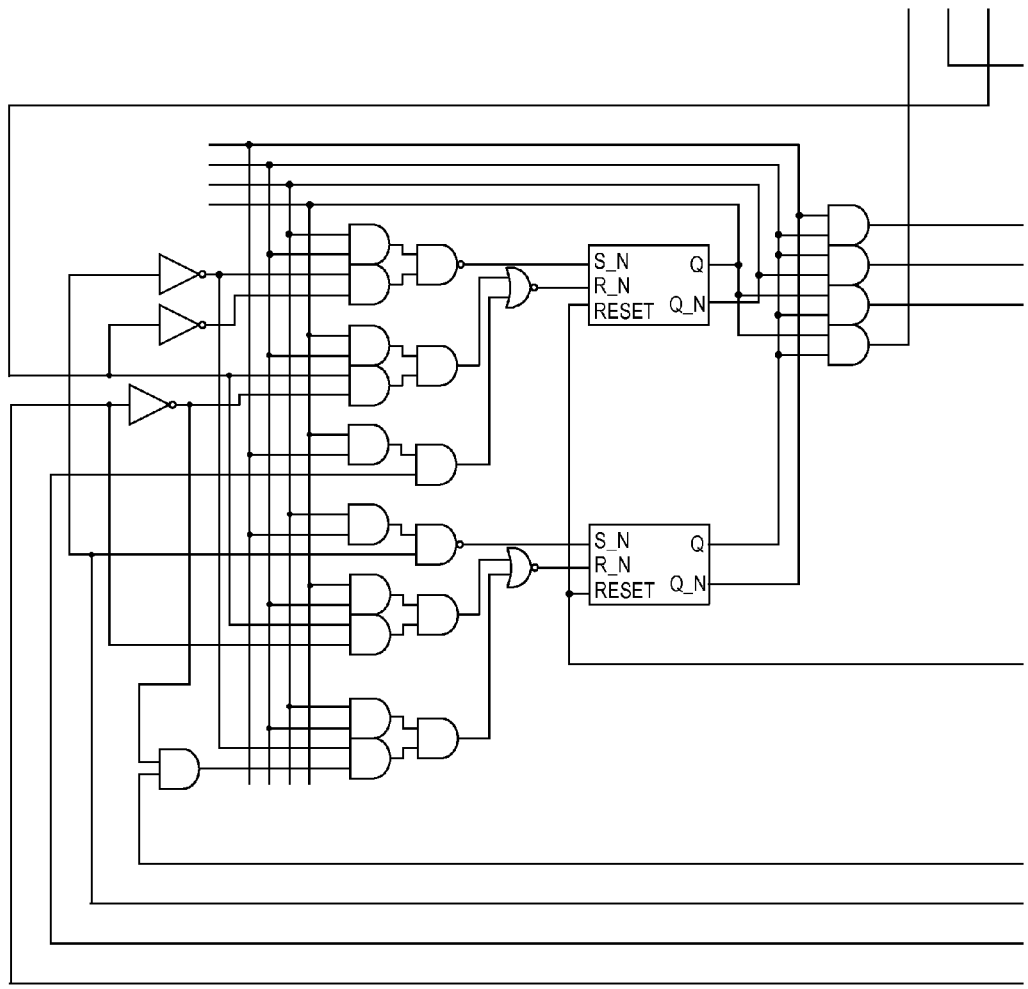
FIG. 11B is a circuit diagram of the self-timed logic run to completion controller of the STLEBSG.
Figure 11:
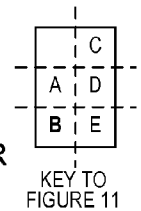
FIG. 11C is a circuit diagram of the self-timed logic LFSR of the STLEBSG.
FIG. 11D is a circuit diagram of the self-timed logic incrementer of the STLEBSG.
FIG. 11E is a circuit diagram of the synchronous controller of the STLEBSG.
Figure 11D:
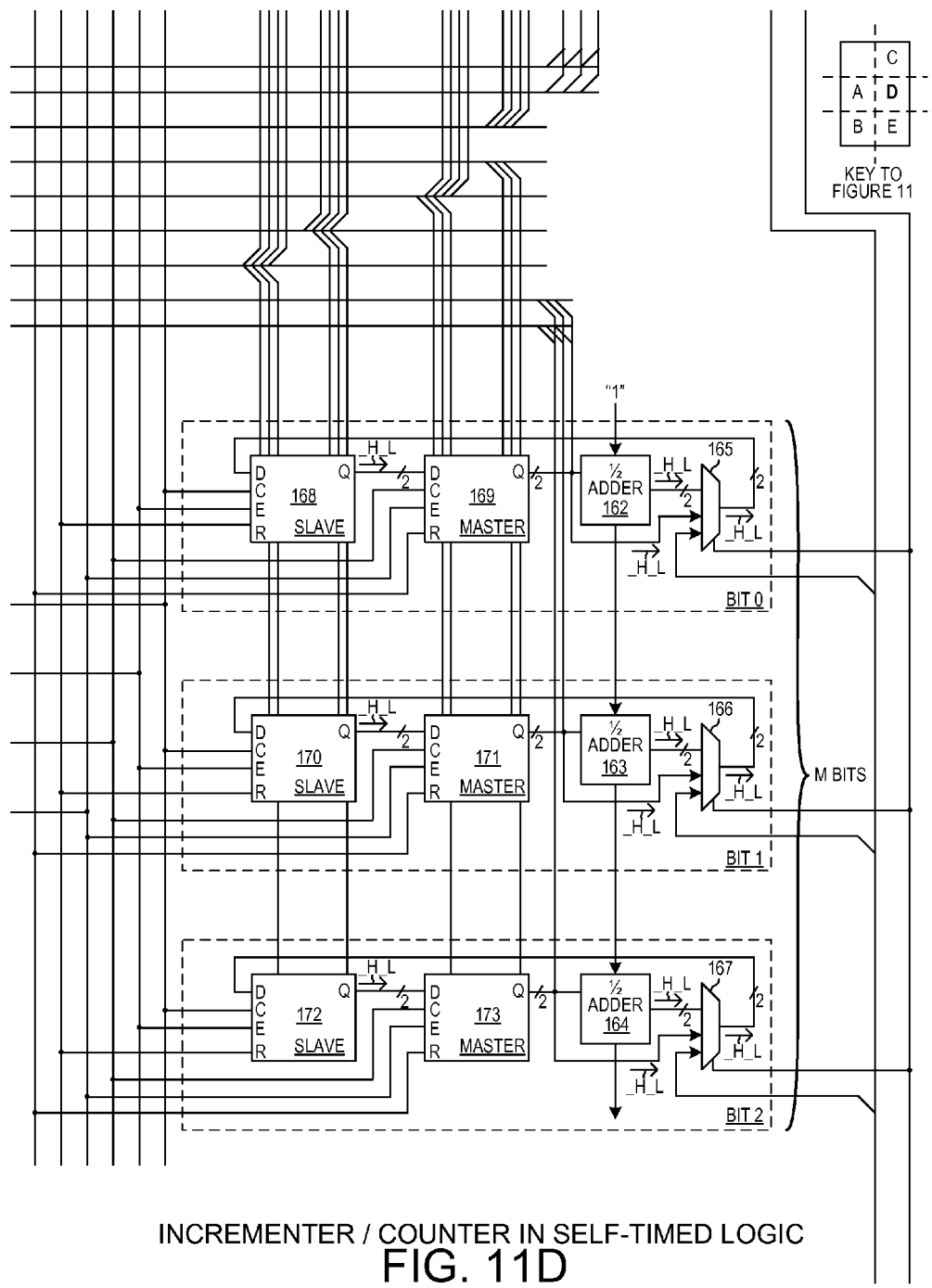

FIGS. 11A, 11B, 11C, 11D and 11E together form one larger composite FIG. 11. FIG. 11 is a circuit diagram of the STLEBSG 109 of FIG. 5. The three slave latch/master latch pairs of the three-bit self-timed logic incrementer 129 are shown in FIG. 11D. The first slave latch/master latch pair is 168, 169. The second slave latch/master latch pair is 170, 171. The third slave latch/master latch pair is 172, 173. The incrementer 129 is a counter, which is a state machine. The next state logic in this case involves half adders 162-164 and multiplexers 165-167.

The ten slave latch/master latch pairs of the ten-bit self-timed logic LFSR 130 are shown in FIG. 11C. The first slave latch/master latch pair is 174, 175. The second slave latch/master latch pair is 176, 177. The third slave latch/master latch pair is 178, 179. The ninth slave latch/master latch pair is 180, 181. In this case, the next state logic includes XOR gate 188 and multiplexers 182-185. The self-timed logic data register controller 128 that controls the slave latches and master latches as explained in connection with FIGS. 9 and 10 is shown in FIG. 11A. The self-timed logic run-to-completion controller 127 that supplies the TICK signal to the self-timed logic data register controller 128 is shown in FIG. 11B. The synchronous controller 126 is shown as a block in FIG. 11E.

Figure 12:
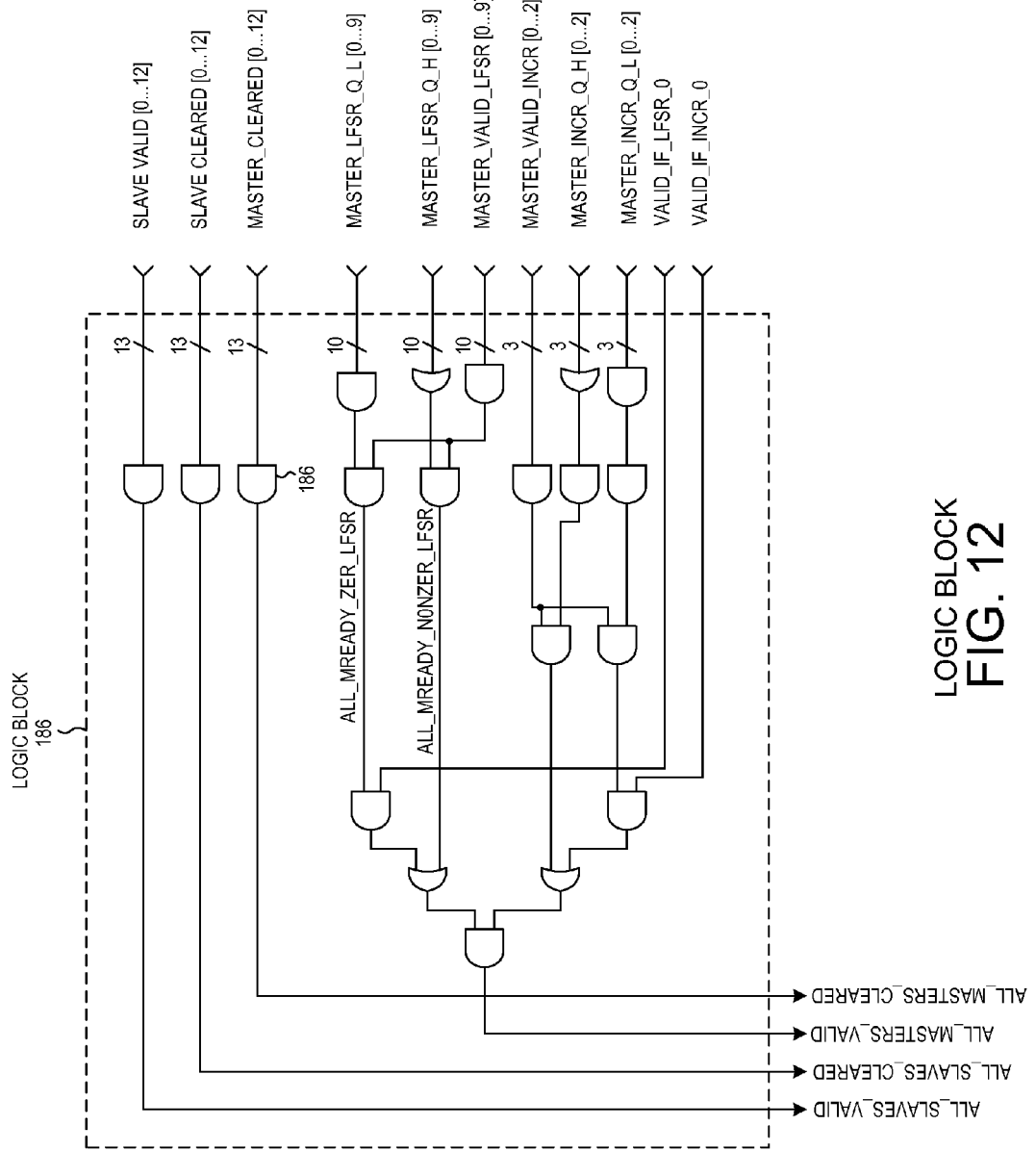
FIG. 12 is a circuit diagram of the logic block of FIG. 11A.

FIG. 12 is a circuit diagram that shows the content of the logic block 186 in the upper left corner of FIG. 11A. For example, the ALL_MASTERS_CLEARED detect signal is generated using the thirteen MASTER_CLEARED[0 . . . 12] signals. As mentioned above, a latch is in the "cleared" condition if neither of its Q_H and Q_L output signals is high. In each latch there is a gate that detects this condition. There are three master latches in the three-bit incrementer, and there are ten master latches in the ten-bit incrementer, so there are thirteen total master latches. The MASTER_CLEARED signal from each such master latch is received onto the logic block 186 as the MASTER_CLEARED[0 . . . 12] signals. If all of these thirteen signals is high, then all the master latches are in the cleared condition. The thirteen-input AND gate 187 therefore receives the MASTER_CLEARED[0 . . . 12] signals and outputs the desired ALL_MASTERS_CLEARED signal. The other condition detect signals ALL_SLAVES_VALID, ALL_SLAVES_CLEARED and ALL_MASTERS_VALID are generated in similar ways by gates of the logic block 186.

Figure 13:
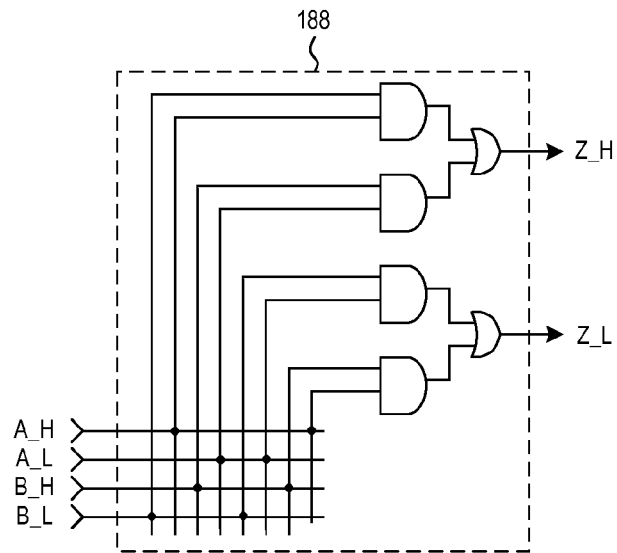
FIG. 13 is a circuit diagram of a two-input XOR gate (two wire logic) present in the STLEBSG of FIG. 11.

FIG. 13 is a circuit diagram of the two-input XOR gate 188 (two wire logic) of the self-timed logic LFSR 130 of FIG. 11C.

Figure 14:
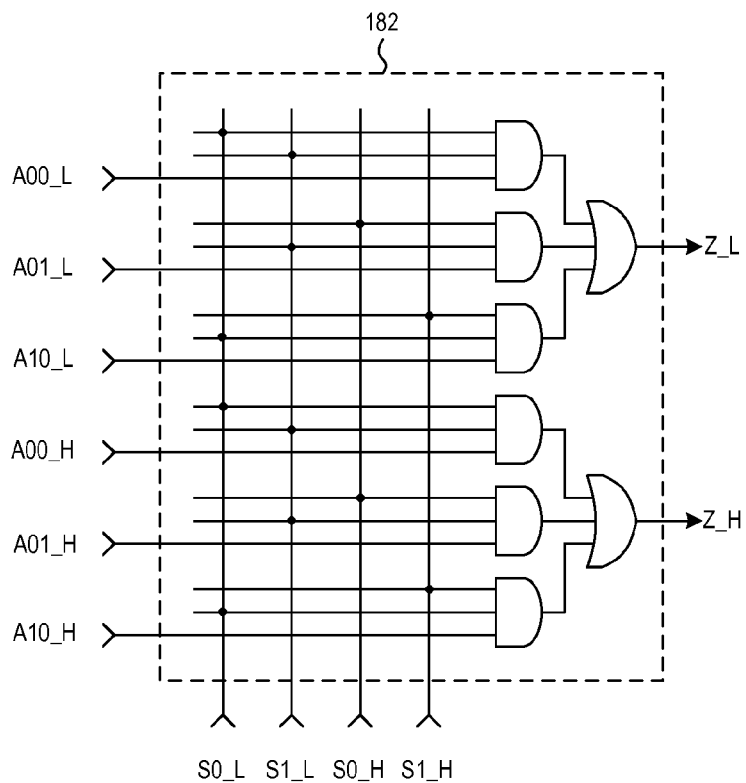
FIG. 14 is a circuit diagram of a three-to-one multiplexer (two wire logic) present in the STLEBSG of FIG. 11.

FIG. 14 is a circuit diagram of one of the three-to-one (two wire logic) multiplexers 182 of the self-timed logic LFSR 130 of FIG. 11C and of the self-timed logic incrementer 129 of FIG. 11D.

How the self-timed logic LFSR 130 is realized is explained in connection with FIG. 15. FIG. 15 is a diagram of an LFSR realized in standard logic. LFSR includes a string of ten flip-flops 189-198, organized as a shift register, except that an exclusive OR gate 199 is provided to supply the data signal that is supplied back into the first flip-flop 189 of the string. In the illustrated example, the inputs to the exclusive OR gate 199 are taken from the Q[5] output of the sixth flip-flop and from the Q[9] output of the tenth flip-flop. The multiplexers 200-209 are provided to allow the flip-flops of the LFSR to be synchronously parallel loaded with LOAD_DATA[0 . . . 9] when LOAD is asserted.

FIG. 16 is the same logic as shown in FIG. 15, only it is shown rearranged so that the flip-flops are vertically oriented. The multiplexers are similarly oriented in a vertical column to the right of the column of flip-flops. The upper multiplexer has the associated XOR gate 199. Many of the bits perform a shifting function. For example, provided that LOAD is not asserted, the Q[0] output of the first flip-flop 189 of the string passes through a multiplexer and becomes the data input [1] to the second flip-flop 190 of the string. Similarly, the Q[1] output of the second flip-flop 190 of the string passes through a multiplexer and becomes the data input [2] to the third flip-flop 191 of the string. The data input for the first flip-flop, however, is obtained from the output of the XOR gate 199 that is supplied to the data input of the first flip-flop through multiplexer 200. The signal feedback via the XOR gate is what gives the structure its LFSR character. The synchronous LFSR of FIG. 16 is presented to show the similar structure of the vertically oriented slave and master latch structure of the self-timed logic LFSR of FIG. 11C. Note that in FIG. 11C, the multiplexers provided to enable parallel loading of the LFSR latches are oriented in a vertical column to the right of the columns of slave and master latches. This is similar to the vertically oriented column of multiplexers in FIG. 16. Likewise, note that in FIG. 11C there is an XOR gate 199 feeding the upper right multiplexer 200. This is similar to the XOR gate 199 that feeds to upper right multiplexer 200 in FIG. 16.

Figure 17:
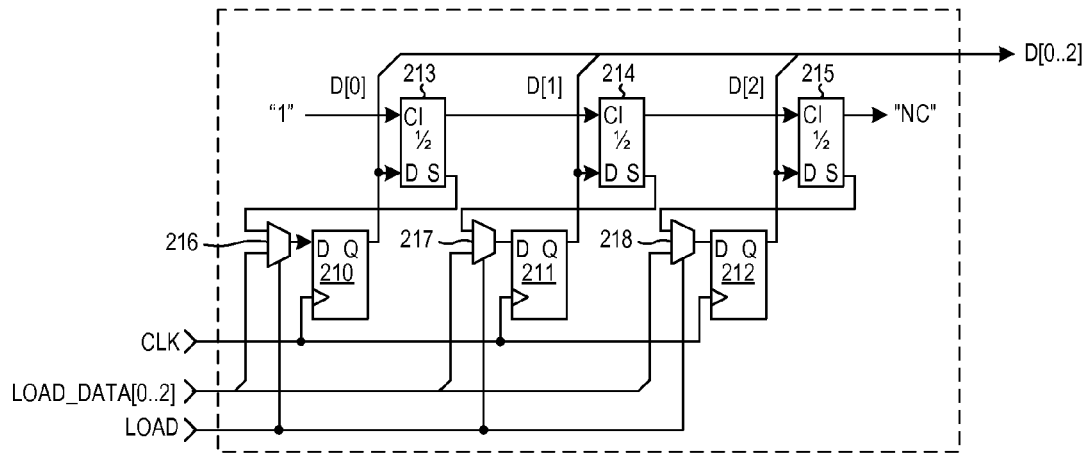
FIG. 17 is a circuit diagram of a synchronous counter.

How the self-timed logic incrementer 129 is realized is explained in connection with FIG. 17. As explained above, incrementer 129 is a 3-bit counter. FIG. 17 is a diagram of a synchronous 3-bit counter realized in standard logic with flip-flops. There are three flip-flops 210-212 to store state. The half-adder circuits 213-215 are provided as the next state logic. For example, the Q data output of the first bit is supplied to the D input of half-adder 213. A "1" value carry in signal is supplied to the carry in CI input of the first half-adder 213. The sum output S of the first half-adder is supplied back to the D input of the first flip-flop 210 via multiplexer 216, whereas the carry out CO signal output by half-adder 213 is supplied to the carry in CI of the second half-adder 214 of the next flip-flop. The 3-bit counter can be synchronously parallel-loaded with LOAD_DATA[0 . . . 2] by asserting signal LOAD. The multiplexers 216-218 are provided for this parallel load purpose.

Figure 18:
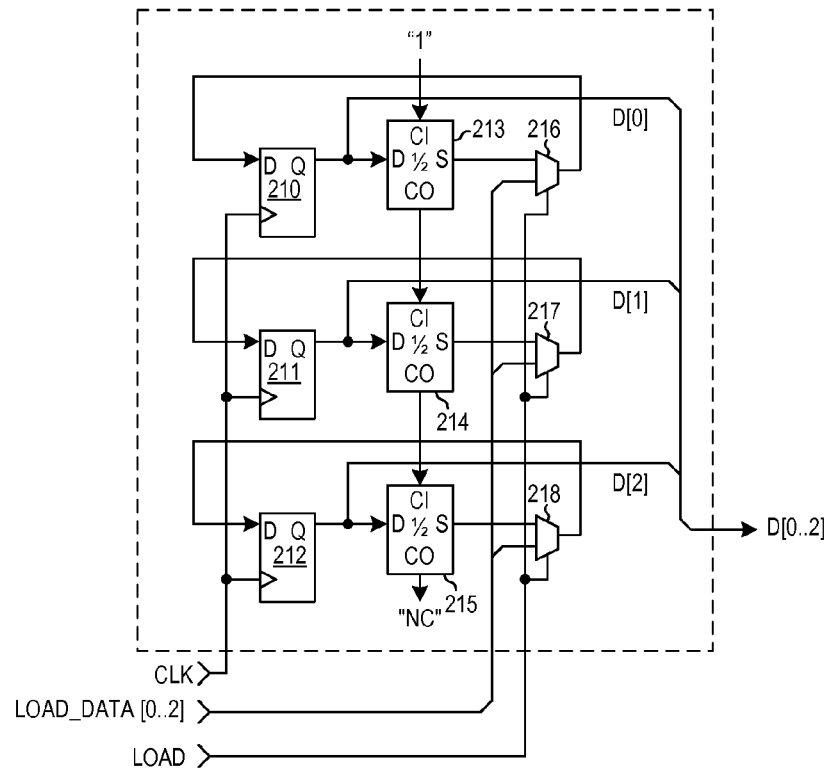
FIG. 18 is a circuit diagram that shows the synchronous counter of FIG. 17 in a different orientation.

FIG. 18 is the same synchronous logic as shown in FIG. 17, only it is shows rearranged so that the flip-flops 210-212 are vertically oriented. Likewise the half-adders 213-215 are vertically oriented in a column. Likewise, the multiplexers 216-218 are vertically oriented in a column. The synchronous counter of FIG. 18 is presented to show the similar structure of the vertically oriented slave and master latch structure of the self-timed logic incrementer 129 of FIG. 11D. In FIG. 11D, similar to FIG. 18, the sequential logic elements are oriented in a vertical column. In FIG. 11D, similar to FIG. 18, the half-adders are oriented in a vertical column. In FIG. 11D, similar to FIG. 18, the multiplexers are oriented in a vertical column.

Figure 19:
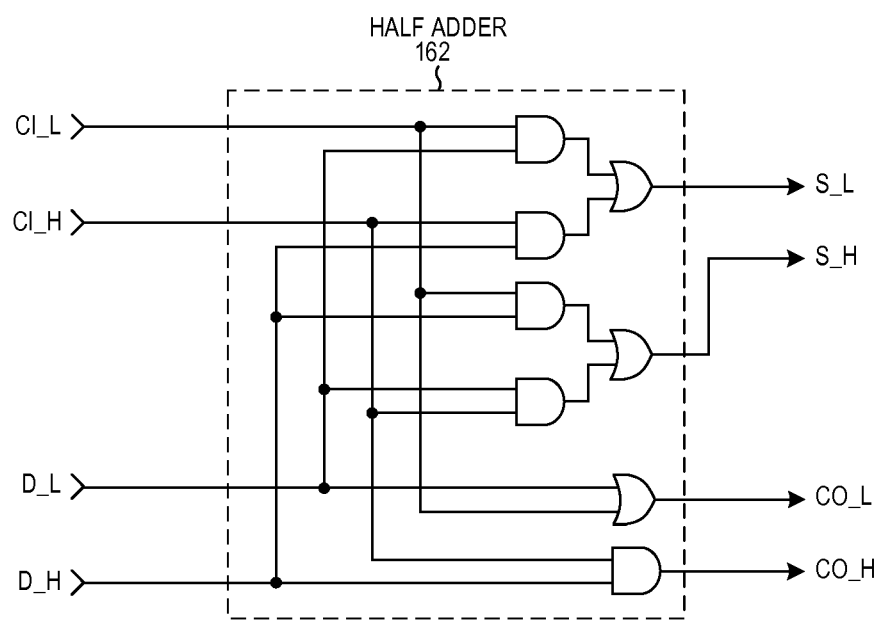
FIG. 19 is a circuit diagram of a half-adder (two wire logic) present in the STLEBSG of FIG. 11.

FIG. 19 is a circuit diagram of one of two-wire half-adders 162 within the self-timed logic incrementer 129 of FIG. 11.

Figure 20:
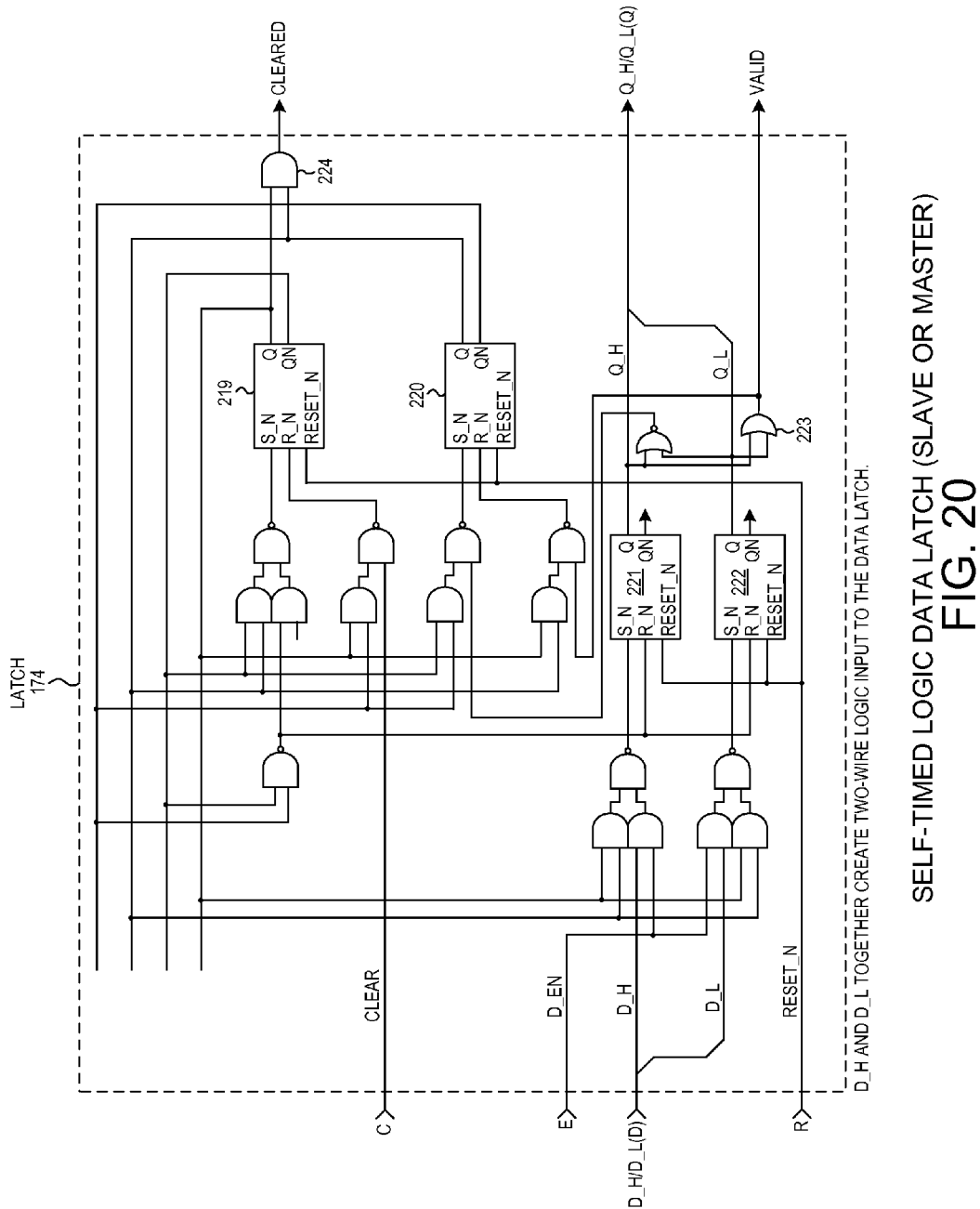
FIG. 20 is a circuit diagram of a self-timed logic data latch (slave or master) present in the STLEBSG of FIG. 11.

FIG. 20 is a circuit diagram of one of the self-timed logic latches 174 of FIG. 11. The same circuit is used both for the slave latches of FIG. 11, as well as for the master latches of FIG. 11. The blocks 219-222 in FIG. 20 are SR latches.

FIG. 21 is a circuit diagram of one of the four SR latches 219 of FIG. 20. OR gate 223 detects whether the latch is storing valid data by detecting the condition in which either Q_H is high or Q_L is high. If either Q_H is high or Q_L is high, then the latch is storing valid data and the signal VALID as output by the OR gate 223 is asserted. The cleared condition, on the other hand, occurs when both Q_H and Q_L are low. Gate 224 detects this condition and asserts the signal CLEARED high. The data signal received by the latch is a two-wire logic signal involving D_H and D_L. Likewise, the Q signal output by the latch is also a two-wire logic signal involving Q_H and Q_L. The notation D_H/D_L and Q_H/Q_L labeling a single line denote such pairs of two-wire logic signals. In FIG. 11, every input signal D being received into a latch symbol and every output signal Q being output from a latch symbol of FIG. 11 is a two-wire logic signal The run-to-completion controller 127 of FIG. 11B is a self-timed logic state machine that provides the TICK signal to the data register controller 128 of FIG. 11A. The state machine causes the TICK signal to be asserted high. The state machine then waits for the self-timed logic to acknowledge the high transition of TICK. Only when the self-timed logic acknowledges the high transition of TICK by asserting TICK_ACK high does the state machine assert the TICK signal low. Again, the state machine waits for the self-timed logic to acknowledge the low transition of TICK. When the self-timed logic acknowledges the low transition of TICK by forcing the TICK_ACK signal low, then the state machine responds and forces the TICK signal high. In this way, the run-to-completion controller causes the TICK signal to transition in response to TICK_ACK acknowledgements from the self-timed logic.

The run-to-completion controller state machine begins in state 00 and waits for a contemporaneous logic high level "START" signal and a valid "SINGLE" signal from the synchronous controller. In state 00 the RTC_READY signal is set to a logic high level. Once these signal are received contemporaneously, the state machine transitions from state 00 to state 01. In state 01 TICK is in a logic low level. The state machine transitions to state 11 upon both the "START" signal and the TICK_ACK signal become a logic low level. In state 11 the state machine sets TICK to a logic high level. Setting TICK to a logic high level makes the data register controller to move the data state by a half cycle and causes the register controller to set the TICK_ACK signal to become a logic high level. When the TICK_ACK signal becomes a logic high level the state machine transitions to state 01 if the state machine is programmed to run continuously, or to state 10 if the state machine is programmed to run in single run mode. The state machine transitions from state 01 to state 11 TICK_ACK signal becomes logic level low. This makes the second half of the cycle happen. Alternatively, the state machine transitions from state 01 to state 00 if the START signal is a logic low level, the DONE signal is a logic high level, and the SINGLE signal is a logic low level. This occurs when the data latches indicate that the data value is now done (i.e. the incrementer had a zero value). Alternatively, the state machine transitions from state 10 to state 00 when the RTC_DONE_ACK signal is a logic high level. In state 10 signal RTC_DONE is set to a logic high level. The RTC_DONE_ACK signal is generated by the synchronous controller. It is noted that the run-to-completion controller can be reset by waiting for the RTC_READY signal or the RTC_DONE signal to be set to a logic high level and then toggling the RTC_DONE_ACK to a logic high level.

This results in two possible state machine paths. The first path starts at state 00, alternates between states 01 and 11 n times, then transitions to state 01, and finally state 00, where n is the count value of the incrementer. This first state machine path is referred to as the "RUN" mode. The first state machine path is initiated by contemporaneously receiving a logic high level "START" signal and a valid logic low level "SINGLE" signal from the synchronous controller. The first state machine path is used for a single run or a repeated run operations. The second path follows the following state transitions: 00, 01, 11, 10, 00. This second state machine path is referred to as the "LOAD_INCR" or "LOAD_LFSR" mode. The second state machine path is initiated by contemporaneously receiving a logic high level "START" signal and a valid logic high level "SINGLE" signal from the synchronous controller.

Figure 22:
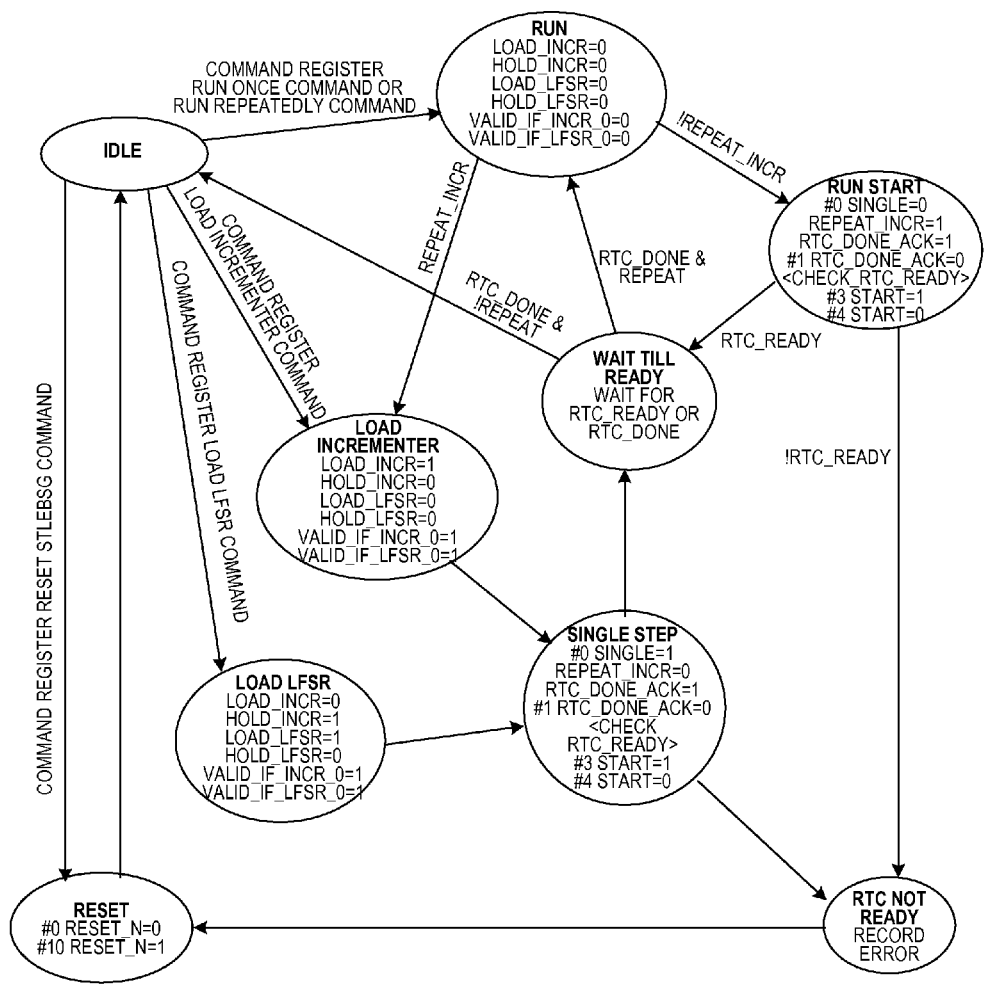
FIG. 22 is a state diagram that illustrates operation of the synchronous controller of the STLEBSG of FIG. 11.

FIG. 22 is a state diagram that describes the operation of the synchronous controller 126 of FIG. 11E. The synchronous controller 126 provides an interface between synchronous circuitry outside the STLEBSG block 109, and the self-timed logic circuits of the STLEBSG block 109. The ARM processor, through the CB bus, can write to various registers in the set 112 of registers, and through the synchronous controller 126 affect operation of the STLEBSG. The synchronous controller 126 is implemented as a synchronous state machine having the following nine states: IDLE, RUN, RUN START, WAIT TILL READY, SINGLE STEP, RTC NOT READY, RESET, LOAD INCREMENTER, LOAD LFSR. As the synchronous controller 126 transitions through its states, it causes various signals supplied to the self-timed logic to pulse and to transition logic levels is such a way that the self-timed logic is made to transition state in a desired way. In the diagram of FIG. 22, the signal names in the circles indicate signals output by the synchronous controller 126 to the other self-timed logic portions of the STLEBSG. The value of a signal name set forth in a state circle indicates that the signal of that name is set to have the indicated value when the state machine is in that state. In the diagram of FIG. 22, a signal name on an arrow extending from one state circle to another state circle indicates a condition upon which the state to state transition occurs. For example, if the state machine of the synchronous controller 126 is in state RUN, then the state machine transitions to the LOAD INCREMENTER state if the signal REPEAT_INCR is true as indicated by the REPEAT_INCR label on the arrow between the RUN state and the LOAD INCREMENTER state. Otherwise, if the REPEAT_INCR signal is not true as indicated by the !REPEAT_INCR label on the arrow between the RUN state and the RUN START state, then the state machine transitions to the RUN START state. The ! character indicates "NOT". In the notation used, the "#10 RESET_N=1" text in a state circle means that in CLK cycle number ten the synchronous controller 126 causes the signal RESET_N to be high. The state machine of the synchronous controller can stay in a state for a number of cycles of CLK, with the state machine changing the values of output signals from CLK cycle to CLK cycle. The synchronous controller interfaces to the run-to-completion controller. REPEAT is a single bit of state that accompanies the synchronous state machine. It is SET for a repeated run command; it is CLEARED for a single run command. REPEAT is set or cleared when a RUN command arrives. REPEAT is set if a repeated operation and is clear if a single operation. REPEAT_INCR is a single bit of state that accompanies the synchronous state machine. REPEAT_INCR is SET and CLEARED in the synchronous state machine. REPEAT_INCR instructs the state machine whether to do the LOAD_INCR or do a RUN, and REPEAT_INCR toggles between SET and CLEARED so that when doing a repeated run it alternates between LOAD_INCR and RUNs. REPEAT is set by the control bus. REPEAT_INCR is set by the synchronous state machine.

Figure 23:
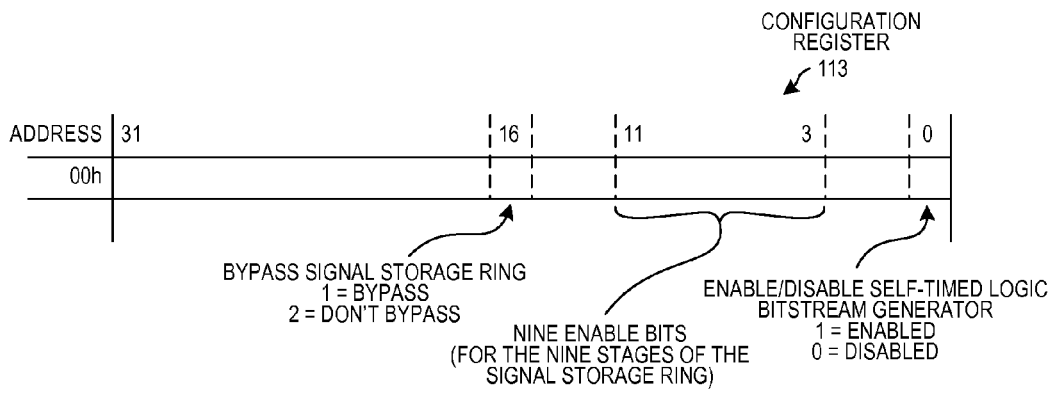
FIG. 23 is a diagram of the configuration register 113 of the random number generator of FIG. 5.

FIG. 23 is a diagram that illustrates the configuration register 113 that the ARM processor of island 25 can write to at address 00h across the CB bus. A "1" value in bit 16 causes the multiplexer 133 of FIG. 5 to bypass the signal storage ring 132 such that the bit stream 125 is supplied directly to the pseudo-random number generator 111, whereas a "0" value in bit 16 causes the multiplexer 133 to couple the output of the signal storage ring 132 to the pseudo-random number generator 111. A "1" value in bit 0 causes the STLEBSG to be enabled, whereas a "0" in bit 0 causes the STLEBSG to be disabled and to stop transitioning.

Figure 24:
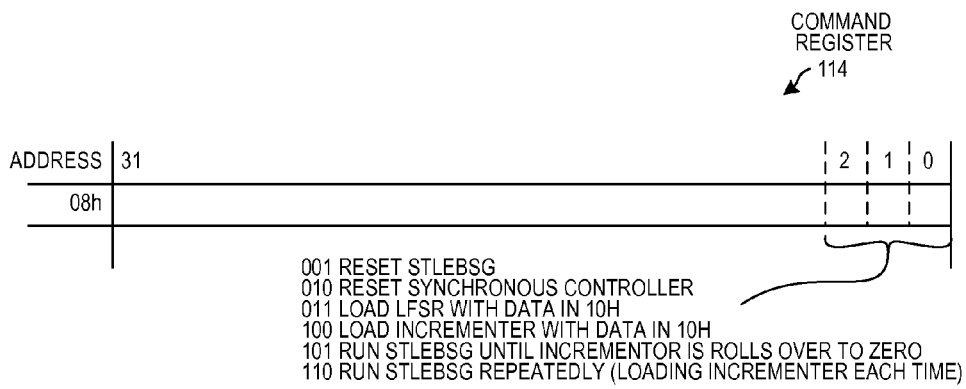
FIG. 24 is a diagram of the command register 114 of the random number generator of FIG. 5.

FIG. 24 is a diagram that illustrates the command register 114 that the ARM processor of island 25 can write to at address 08h across the CB bus. The three-bit value in bits 0, 1 and 2 of the command register indicates a command. For example, a three-bit value of "001" is a command to reset the STLEBSG. For example, a three-bit value of "011" is a command to parallel load the LFSR 130 with the value in the data field of the data register at 10h. For example, a three-bit value of "100" is a command to parallel load the incrementer 129 with a value in the data field of the data register at 10h. For example, a three-bit value of 101" is a command to run the STLEBSG once until the incrementer rolls over and reaches a count of zero. For example, a three-bit value of "110" is a command to run the STLEBSG repeatedly so that the incrementer increments and rolls over to zero, but then is automatically reinitialized with the value in the data field of the data register at 10h, is then restarted so that it increments again. This incrementing up a predetermined number of times and then reinitializing is repeated over and over indefinitely.

Figure 25:
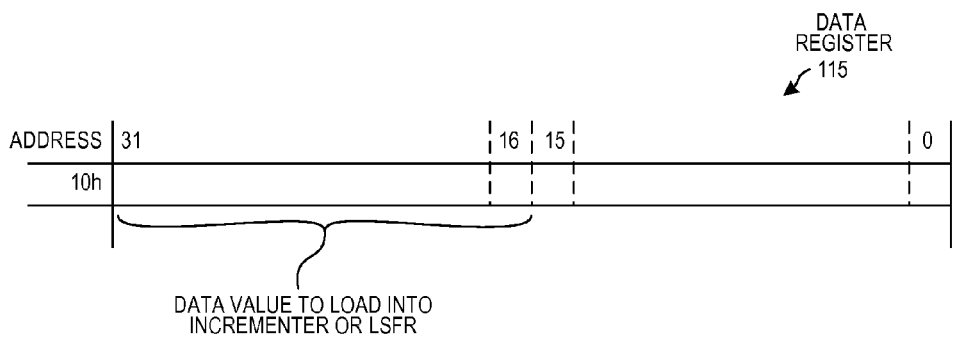
FIG. 25 is a diagram of the data register 115 of the random number generator of FIG. 5.

FIG. 25 is a diagram that illustrates the data register 115 that the ARM processor of island 25 can write to at address 10h across the CB bus. The bits 16 through 31 store a sixteen-bit data value. This sixteen-bit data value is used by the command indicated in the command register. In the case of a load LFSR command, the value parallel loaded into the LFSR is this sixteen-bit value. In the case of a load incrementer command, the value parallel loaded into the LFSR is this sixteen-bit value.

In one example, the ARM processor writes a value into the data register 115 that is going to be loaded into the LFSR 130. The ARM processor then writes a value into the command register 114, where bits 0-2 are "011". The synchronous controller starts in its IDLS state, and the incoming command "011" (load LFSR with data in 10h) causes the state machine to transition to the LOAD LFSR state. Signals are supplied to the LFSR to assert the LOAD signal to the LFSR. The state machine then transitions to the SINGLE STEP state. In cycle zero, the signal SINGLE is set to one, and REPEAT_INCR is set to zero, and RTC_DONE_ACK is set to one. In cycle one, RTC_DONE_ACK is set to zero, and RTC_READY is checked. In cycle three the signal START is set to one, and in cycle four the signal START is set to zero. The state machine then transitions to the WAIT TILL READY state. When the latches of the LFSR 130 are confirmed to contain valid data, then the signal RTC_DONE is high. The REPEAT signal, as set by the command in the command register, is not high. The state machine therefore transitions back to the IDLE state. Accordingly, the LFSR 130 was supplied with the data to be parallel loaded into the LFSR, the LFSR latches were enabled once to latch in the data, and the state machine returned to the IDLE state.

Next, the ARM processor writes a value into the data register 115 that is going to be loaded into the incrementer 129. The ARM processor then writes a value into the command register, where bits 0-2 are "100". The synchronous controller starts in its IDLS state, and the incoming command "100" (load incrementer with data in 10h) causes the state machine to transition to the LOAD INCREMENTER state. Signals are supplied to the incrementer to assert the LOAD signal to the incrementer. The state machine then transitions to the SINGLE STEP state. In cycle zero, the signal SINGLE is set to one, and REPEAT_INCR is set to zero, and RTC_DONE_ACK is set to one. In cycle one, RTC_DONE_ACK is set to zero, and RTC_READY is checked. In cycle three the signal START is set to one, and in cycle four the signal START is set to zero. The state machine then transitions to the WAIT TILL READY state. When the latches of the incrementer are confirmed to contain valid data, then RTC_DONE is true. The REPEAT signal, as set by the command in the command register, is not high. The state machine therefore transitions back to the IDLE state. Accordingly, the incrementer 129 was supplied with the data to be parallel loaded into the incrementer, the incrementer latches were enabled once to latch in the data, and the state machine returned to the IDLE state.

Next, the ARM processor writes a value into the command register 114, where bits 0-2 are "101". The synchronous controller 126 starts in its IDLE state, and the incoming command "101" (run STLEBSG once until the incrementer rolls over to zero) causes the state machine to transition to the RUN state. Because the REPEAT_INCR is cleared automatically when a command is received, the value !REPEAT_INCR is true. The state machine therefore transitions to state RUN START. In clock cycle zero, the signal SINGLE is set to zero, and REPEAT_INCR is set to one, and RTC_DONE_ACK is set to one. In clock cycle one, RCT_DONE_ACK is set to zero. In clock cycle three, the START signal is set to one. In clock cycle four, the START signal is set to zero. This pulsing of the START signal supplied to the self-timed logic of the remainder of the STLEBSG causes the incrementer 129 to start incrementing, starting at the initial count value that was written into the incrementer as a result of the prior "load incrementer" command. Moreover, for each increment of the incrementer 129, the LFSR 130 transitions one state, where the initial value in the LFSR is the value written into the LFSR as a result of the prior "load LFSR" command. In the WAIT TILL READY state, the incrementing continues until RTC_DONE is detected. When the incrementer rolls over and reaches a count value of zero, RTC_DONE is true, and the state machine returns to the IDLE state. During the time that the incrementer is incrementing the bit stream 125 is output from the LFSR 130 to the signal storage block 110.

In an example of a "run repeatedly" command, the signal REPEAT is high due to the command in the command register 114 being a "run repeatedly" command. The incrementer 129 has already been set up to have an initial count value, and the LFSR 130 has already been set up to have an initialized value. The synchronous controller 126 goes from IDLE, to RUN, to RUN START, to WAIT TILL READY. When the incrementer has incremented to roll over, then the signal RTC_DONE received onto the synchronous controller is true. In response, the synchronous controller state machine transitions to RUN, to LOAD INCREMENTER, to SINGLE STEP, to WAIT TILL READY. When the incrementer latches are confirmed to hold data, then the signal RTC_DONE received onto the synchronous controller is true. In response, the synchronous controller state machine transitions to RUN, to RUN START, to WAIT TILL READY so that the incrementer will increments up again. This process is repeated indefinitely, with the transitioning synchronous controller state machine generating control signals to the self-timed logic that cause the incrementer to repeatedly increment up until it rolls over and then to be reloaded with its initialization value and to be restarted.

Although the STLEBSG 109 is described here as part of the island-based integrated circuit of FIG. 1, the STLEBSG sees application in other integrated circuits and applications. The STLEBSG has advantages over other entropy signal generators that require analog circuitry and/or special discrete components. The STLEBSG, in contrast, is made entirely of digital logic circuitry and can be implemented in an integrated circuit that does not involve special analog circuits. In one example, a bit stream for programming an FPGA (Field Programmable Gate Array) is commercially provided as a so-called block of "IP". A customer purchases rights to the IP, and is supplied with the bit stream, and then uses loads the bit stream into an FPGA to program an FPGA so that an instance of the STLEBSG is realized in the customer's FPGA device. Even though the FPGA may not have user accessible analog circuits and discrete components, the user can nonetheless instantiate the STLEBSG and generate self-timed logic entropy signals.

Figure 26:
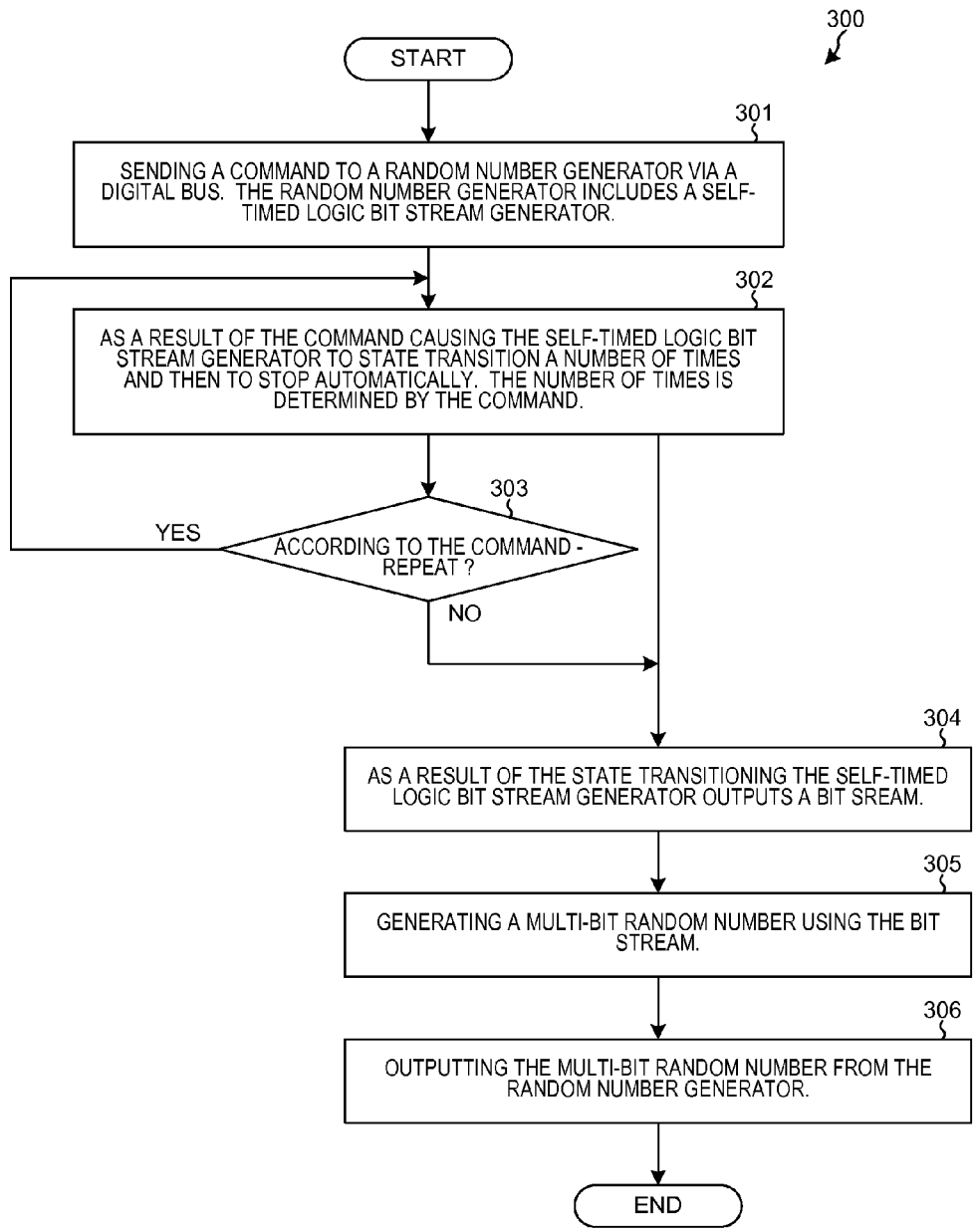
FIG. 26 is a flowchart of a method 300 in accordance with one novel aspect.

FIG. 26 is a flowchart of a method 300 in accordance with one novel aspect. A command is sent (step 301) to the random number generator 83 via the CB digital bus. The random number generator 83 includes the self-timed logic entropy bit stream generator 109. As a result of the command, the self-timed logic entropy bit stream generator 109 transitions state a number of times (step 302) and then stops automatically. The number of times is determined by the command. In one example, the number of times is supplied by writing a data value into the data register 115, and the command is supplied by writing command bits into the command register 114. The combination of the actual command bits and the associated data value is considered together to be the entire command. This command is received onto the random number generator 83 via the CB bus 73. If the command is a run repeatedly command (step 303), then the self-timed logic is reinitialized and is made to state transition the number of times again. As a result of this state transitioning, whether that state transitioning is repeated or not, the self-timed logic entropy bit stream generator 109 outputs (step 304) a bit stream 125. The bit stream 125 is then used (step 305) to generate a multi-bit random number 123. The multi-bit random number 123 is output (step 306) from the random number generator 83 via output FIFO 146, conductors 124 and the OR structure 108.

Figure 27:
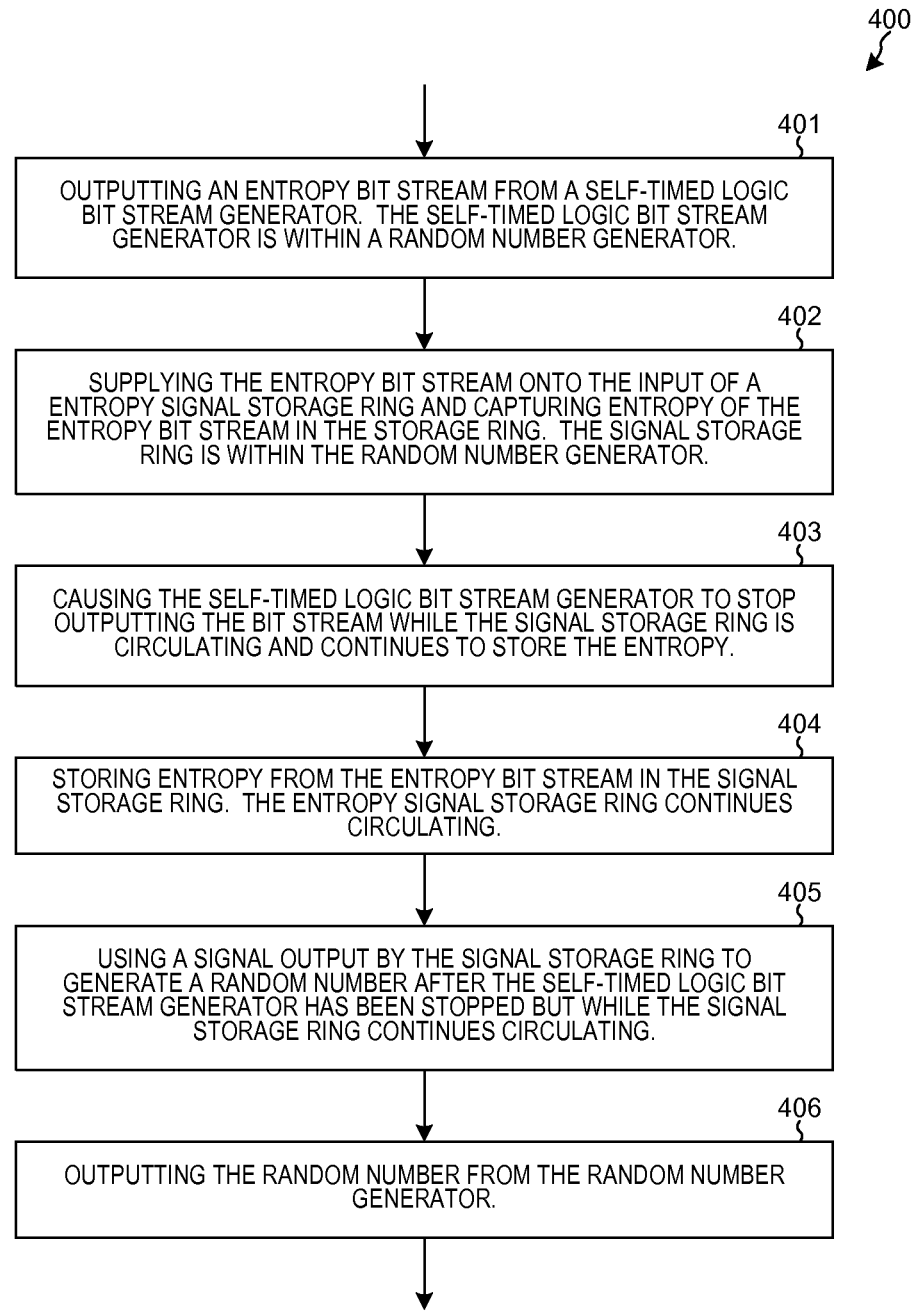
FIG. 27 is a flowchart of a method 400 in accordance with another novel aspect.

FIG. 27 is a flowchart of a method 400 in accordance with another novel aspect. The random number generator 83 includes the self-timed logic entropy bit stream generator 109, the entropy signal storage ring 110, and the pseudo-random number generator 111. The self-timed logic entropy bit stream generator outputs (step 401) the entropy bit stream 125. The entropy bit stream 125 is supplied (step 402) onto the input of the entropy signal storage ring 110 so that the storage ring captures entropy of the bit stream in the ring. The STLEBSG 83 is then made to stop (step 403) outputting the bit stream, but the storage ring continues circulating and storing the entropy. Entropy form the bit stream is stored (step 404) in the storage ring and the ring continues circulating. A output signal 137 output by the storage ring is used (step 405) to generate a 64-bit random number 123 after the self-timed logic entropy bit stream generator 109 has been stopped by while the signal storage ring 110 continues circulating. The 64-bit random number is output (step 406) from the random number generator. In one example, the self-timed logic entropy bit stream generator is made to stop outputting the bit stream by writing an appropriate value into the configuration register 113 such that bit 0 of the configuration register 113 is set to zero. This disabling of the self-timed logic entropy bit stream generator 109 serves to reduce power consumption, and the pseudo-random number generator 111 can continue to generate 64-bit random numbers using entropy stored in the signal storage ring 110.

Figure 28:
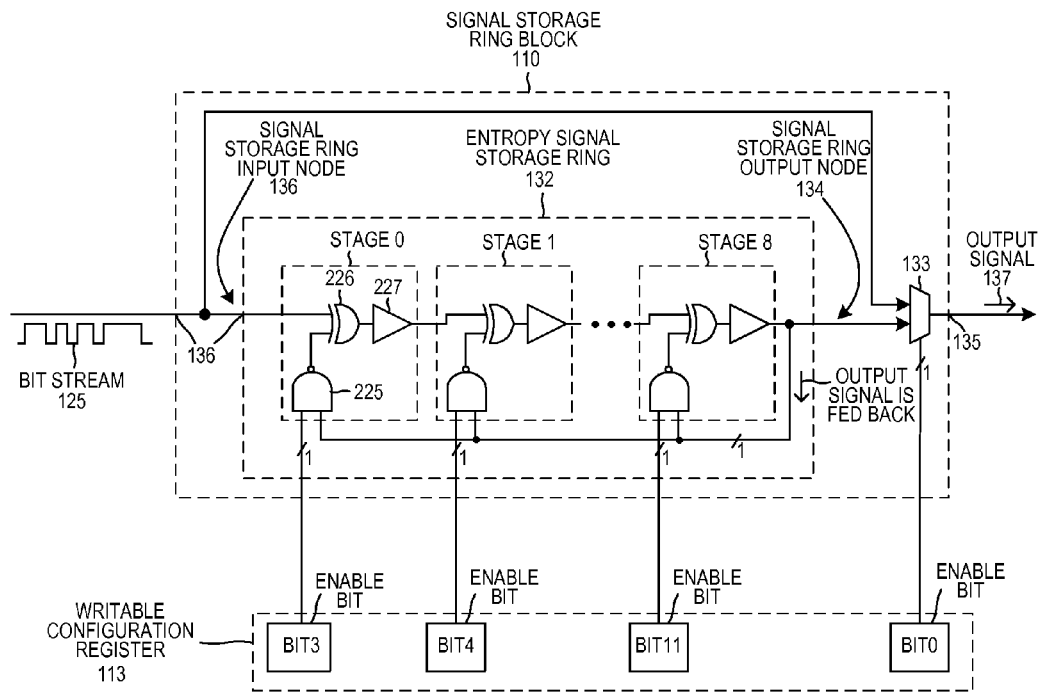
FIG. 28 is a more detailed diagram of the signal storage ring block of FIG. 5.

FIG. 28 is a more detailed diagram of the signal storage ring block 110 of FIG. 5. The signal storage ring block 110 includes the signal storage ring 132 and the multiplexer 133. The signal storage ring 132 includes N series-connected stages, denoted stage 0, stage 1, stage N–1 in FIG. 28. The stages can all be identical structures, or various ones of the stages can differ from one another. In the illustrated example, all the stages are identical. If the enable bit coming into a stage one its enable bit input is a zero value (feedback disabled), then the signal on the data input lead of the stage is inverted and is output onto the data output lead of the stage. The stages are therefore said to be inverting. The signal path from the signal storage ring input node 136 to the signal storage ring output node 134 in this configuration is an inverting signal path because the path goes through an odd number of inverting stages.

Consider the situation in which all the nine enable bits (BIT3-BIT11) of the writable configuration register 113 are zero values (feedback disabled), except for the first enable bit BIT3 for the first stage which is a one value (feedback enabled). There are an odd number of stages, and the stages are inverting, so the ring is a ring oscillator in that the bit stream, as it circulates, is inverted each time it travels around the ring. The incoming bit stream 125 is supplied onto the signal storage ring input node 136, and passes through the chain of nine stages to the signal storage ring output node 134. Due to the propagation delay required to pass through the stages, the bit stream 125 is effectively stored in the various stages at a given instant in time. As the front end of the bit stream 125 reaches the signal storage ring output node 134, the front end of the bit stream is fed back to the feedback inputs of the stages. In this example, only the first stage is enabled. The feedback bit stream value is inverted by the combinatorial logic circuit 225 of stage 0, and is then XORed by structure 226 with the next incoming value of the bit stream 125 on the signal storage ring input node 136. If the bit stream 125 has stopped transitioning and is a zero, then the feedback signal as inverted by combinatorial logic NAND gate 225 is reintroduced into the first stage 0. The bit stream then circulates around the ring. Depending on the logic employed in the stages and the number of stages, the bit stream may be inverted as it recirculates, or the bit stream may recirculate in without being inverted. Regardless of whether the bit stream is inverted or not, nondeterministic entropy of the original bit stream 125 is stored in the ring even if the incoming bit stream 125 ceases transitioning.

In a typical use, the feedback paths of multiple stages are enabled. The bit stream as it recirculates is permuted in a complex fashion due to the multiple feedback paths. The permuted bit stream is also combined with the remainder of the incoming bit stream 125 on signals storage ring input node 136.

Figure 29:
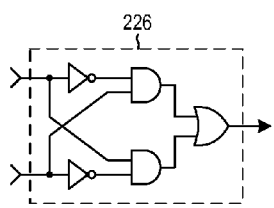
FIG. 29 is a circuit diagram of a first possible way the XOR symbol of FIG. 28 may be implemented.

FIG. 29 is a diagram that illustrates one way that the exclusive OR gate structure 226 can be realized.

Figure 30:
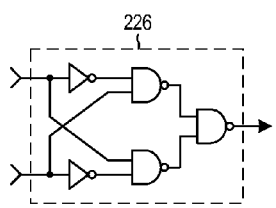
FIG. 30 is a circuit diagram of a second possible way the XOR symbol of FIG. 28 may be implemented.

FIG. 30 is a diagram that illustrates another way that the exclusive OR gate structure 226 can be realized.

FIG. 31 is a diagram that illustrates another example of a stage that is employed in the signal storage ring block 110 of FIG. 28 in some embodiments. Rather than the structure 226 performing an XOR function, the structure 226 performs a XNOR function. The combinatorial logic circuit 225 performs a NAND function. The delay element 227 is a buffer (for example, an even number of series-connected inverters).

FIG. 32 is a diagram that illustrates another example of a stage that is employed in the signal storage ring block 110 of FIG. 28 in some embodiments. The structure 226 performs an XOR function, but the delay element 227 is an inverting structure (for example, an odd number of series-connected inverters), rather than a non-inverting delay element as in the case of FIG. 31. The combinatorial logic circuit 225 performs a NAND function.

FIG. 33 is a diagram that illustrates another example of a stage that is employed in the signal storage ring block 110 of FIG. 28 in some embodiments. The combinatorial logic circuit 225 performs a NOR function, rather than a NAND function as in FIGS. 31 and 32.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) sending a command to a random number generator via a digital bus, wherein the random number generator includes a self-timed logic bit stream generator, and wherein the command includes a value;
   (b) causing the self-timed logic bit stream generator to state transition a number of times and then to stop automatically, wherein the number of times is dependent upon the value, and wherein as a result of the state transitioning the self-timed logic bit stream generator outputs a bit stream; and
   (c) causing the bit stream to be used to generate a multi-bit random number.

2. The method of claim 1, further comprising:
   (d) receiving the multi-bit random number from the random number generator.

3. The method of claim 1, wherein the command in (a) is a first command, and wherein a second command is sent to the random number generator that initiates the state transitioning of the self-timed logic bit stream generator in (b) so that the self-timed logic bit stream generator then state transitions the number of times.

4. The method of claim 3, wherein the first command is a command to load the value into a portion of the self-timed logic bit stream generator, and wherein the second command is a run command.

5. The method of claim 4, wherein the run command causes the following two operations to be repeated multiple times one after the other: 1) the value to be loaded into the portion of the self-timed logic bit stream generator, and 2) the self-timed logic bit stream generator to state transition the number of times.

6. The method of claim 1, wherein the random number generator further comprises a ring oscillator, and wherein the bit stream output by the self-timed logic bit stream generator is supplied onto an input lead of the ring oscillator.

7. The method of claim 6, further comprising:
   (d) causing the self-timed logic bit stream generator to stop state transitioning so that the self-timed logic bit stream generator stops outputting the bit stream while at the same time the ring oscillator continues to oscillate.

8. The method of claim 7, wherein a third command is sent to the random number generator that causes the self-timed logic bit stream generator to stop state transitioning in (d).

9. The method of claim 1, wherein after stopping automatically in (b) the self-timed logic bit stream generator starts state transitioning again and state transitions the number of times and then automatically stops again.

10. The method of claim 1, wherein the self-timed logic bit stream generator comprises a self-timed logic linear feedback shift register (LFSR) and a self-timed logic counter.

11. The method of claim 10, further comprising:
    (d) sending a second command to the random number generator via the digital bus, wherein the second command includes a second value, wherein the second command causes the self-timed logic linear feedback shift register to be loaded with the second value.

12. A random number generator comprising:
    a pseudo-random number generator;
    a ring oscillator that outputs a signal onto an input lead of the pseudo-random number generator; and
    a self-timed logic bit stream generator that outputs a bit stream onto an input lead of the ring oscillator, wherein the self-timed logic bit stream generator comprises:
    a self-timed logic linear feedback shift register (LFSR); and
    a self-timed logic counter coupled to the self-timed logic LFSR.

13. The random number generator of claim 12, wherein the self-timed logic bit stream generator receives a command from a bus, wherein the command is a run command that causes the self-timed logic LFSR to transition state a number of times, and wherein the number of times is determined by the command.

14. The random number generator of claim 12, wherein the self-timed logic bit stream generator is initialized with a value, and wherein the self-timed logic bit stream generator state transitions a number of times and then stops automatically, and wherein the number of times is dependent upon the value.

15. The random number generator of claim 12, wherein the self-timed logic bit stream generator receives a command from a bus, and wherein the command causes a value to be loaded into the self-timed logic courtier.

16. The random number generator of claim 15, wherein the value determines a number of times that the self-timed logic undergoes state transitions before the self-timed logic bit stream generator automatically stops.

17. The random number generator of claim 12, wherein the self-timed logic bit stream generator receives a command from a bus, wherein the command causes a value to be loaded into the self-timed logic LFSR.

18. The random number generator of claim 12, wherein the self-timed logic bit stream generator receives a command from a bus, wherein the command causes the following two operations to be repeated multiple times one after the other: 1) a value to be loaded into the self-timed logic counter, and 2) the self-timed logic bit stream generator to state transition the number of times until the self-timed logic counter reaches a predetermined count.

19. A random number generator comprising:
- means for receiving a command and for causing an amount of self-timed logic to state transition a number of times thereby outputting a bit stream, wherein the number of times is determined by the command;
- a ring oscillator that receives the bit stream from the means; and
- a pseudo-random number generator that receives a signal from the ring oscillator.

20. The random number generator of claim 19, wherein the self-timed logic includes a self-timed logic counter, and wherein the command causes a value to be loaded into the self-timed logic counter.

21. The random number generator of claim 20, wherein the means is also for receiving a second command, wherein the second command is a run command that causes the self-timed logic to start state transitioning.

\* \* \* \* \*